(12) United States Patent
Veltrop et al.

(10) Patent No.: US 10,271,690 B2
(45) Date of Patent: Apr. 30, 2019

(54) MODULAR HEATING UNIT

(71) Applicant: Prince Castle, LLC, Carol Stream, IL (US)

(72) Inventors: Loren Veltrop, Chicago, IL (US); David Anthony Betzold, Fridley, MN (US); Scott W. Beu, Bolingbrook, IL (US); Eric W. Larson, Chicago, IL (US); David E. Paton, Bartlett, IL (US); Ronaldo J. Santiago, South Elgin, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 589 days.

(21) Appl. No.: 14/188,811

(22) Filed: Feb. 25, 2014

(65) Prior Publication Data

US 2014/0263269 A1    Sep. 18, 2014

Related U.S. Application Data

(60) Provisional application No. 61/790,699, filed on Mar. 15, 2013.

(51) Int. Cl.
*A47J 39/02* (2006.01)

(52) U.S. Cl.
CPC .................... *A47J 39/02* (2013.01)

(58) Field of Classification Search
CPC .......... A47J 39/00; A47J 39/006; A47J 39/02; A47J 39/025; A47F 3/001
USPC ....... 219/394, 395, 402, 392, 403, 391, 385, 219/386, 387
See application file for complete search history.

(56) References Cited

U.S. PATENT DOCUMENTS

| | | | |
|---|---|---|---|
| D63,818 S | 1/1924 | Curtiss | |
| D243,362 S | 2/1977 | Shumrak et al. | |
| D341,054 S | 11/1993 | Maputol | |
| D369,269 S | 4/1996 | Labadia Del Fresno | |
| 5,535,664 A * | 7/1996 | Rokowski | A47J 36/32 219/487 |
| 5,783,803 A | 7/1998 | Robards, Jr. | |
| 5,900,173 A | 5/1999 | Robards, Jr. | |
| D434,265 S | 11/2000 | Tatlow | |
| 6,412,403 B1 | 7/2002 | Veltrop | |
| 6,637,322 B2 | 10/2003 | Veltrop | |
| 6,658,994 B1 * | 12/2003 | McMillan | A47F 3/001 219/214 |
| 6,878,391 B2 | 4/2005 | Veltrop | |
| 6,884,451 B2 | 4/2005 | Veltrop | |
| 7,105,779 B2 | 9/2006 | Shei | |
| 7,328,654 B2 | 2/2008 | Shei | |
| 7,385,160 B2 | 6/2008 | Jones | |

(Continued)

OTHER PUBLICATIONS

"Modular Holding Cabinets", Product Catalog, Carter-Hoffmann, Mundelein, Illinois (Jan. 2014).

(Continued)

*Primary Examiner* — Tu B Hoang
*Assistant Examiner* — Alba T Rosario-Aponte
(74) *Attorney, Agent, or Firm* — Marshall, Gerstein & Borun LLP

(57) ABSTRACT

A modular heating unit comprising modular heating bins is disclosed. The modular heating bins may be arranged into different configurations to accommodate different kitchen food preparation layouts.

19 Claims, 27 Drawing Sheets

(56) References Cited

U.S. PATENT DOCUMENTS

| | | | |
|---|---|---|---|
| 7,762,636 | B2 | 7/2010 | Veeser et al. |
| 7,858,906 | B2 | 12/2010 | Veltrop et al. |
| 8,091,472 | B2 | 1/2012 | Maciejewski et al. |
| 8,096,231 | B2 | 1/2012 | Veltrop et al. |
| 2001/0007322 | A1 | 7/2001 | Shei et al. |
| 2003/0118706 | A1* | 6/2003 | Veltrop ............... A47J 36/2483 426/418 |
| 2004/0020915 | A1 | 2/2004 | Shei |
| 2005/0211696 | A1* | 9/2005 | Adamski ................. A47J 39/00 219/400 |
| 2008/0023462 | A1* | 1/2008 | Shei ....................... A47J 39/006 219/394 |
| 2008/0213449 | A1* | 9/2008 | Wisner .................. A47J 39/006 426/520 |
| 2008/0302778 | A1 | 12/2008 | Veltrop et al. |
| 2009/0266244 | A1* | 10/2009 | Maciejewski ........... A47J 39/00 99/485 |
| 2011/0253698 | A1* | 10/2011 | Theodos ............... A47J 39/006 219/385 |
| 2011/0253703 | A1* | 10/2011 | Theodos ................. H05B 1/02 219/492 |
| 2012/0079699 | A1 | 4/2012 | Veltrop et al. |

OTHER PUBLICATIONS

Betzold et al., U.S. Appl. No. 14/278,549, "Modular Food Holding Cabinet Having Individually Configurable Food Holding Units", filed May 15, 2014.

Veltrop et al., U.S. Appl. No. 29/450,074, "Food Warmer", filed Mar. 15, 2013.

Veltrop et al., U.S. Appl. No. 29/494,683, "Food Warmer", filed Jun. 23, 2014.

\* cited by examiner

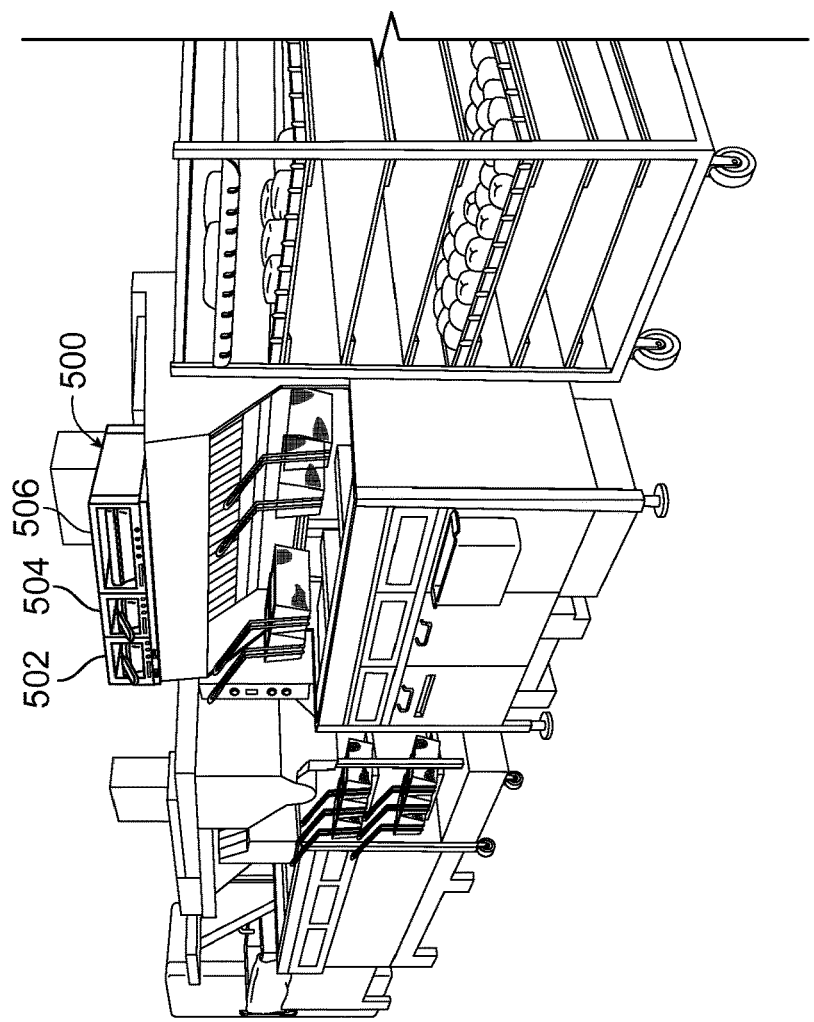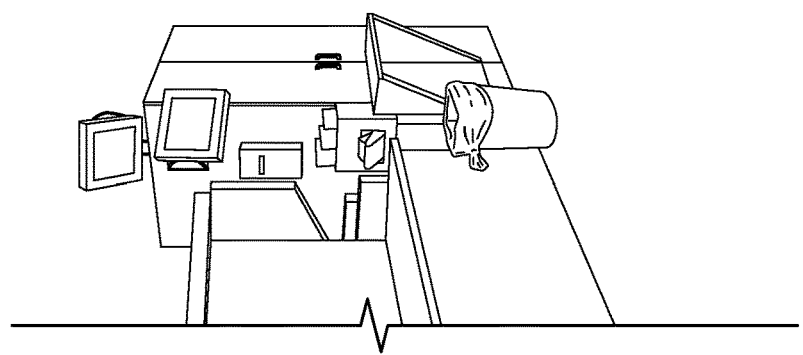
FIG. 5

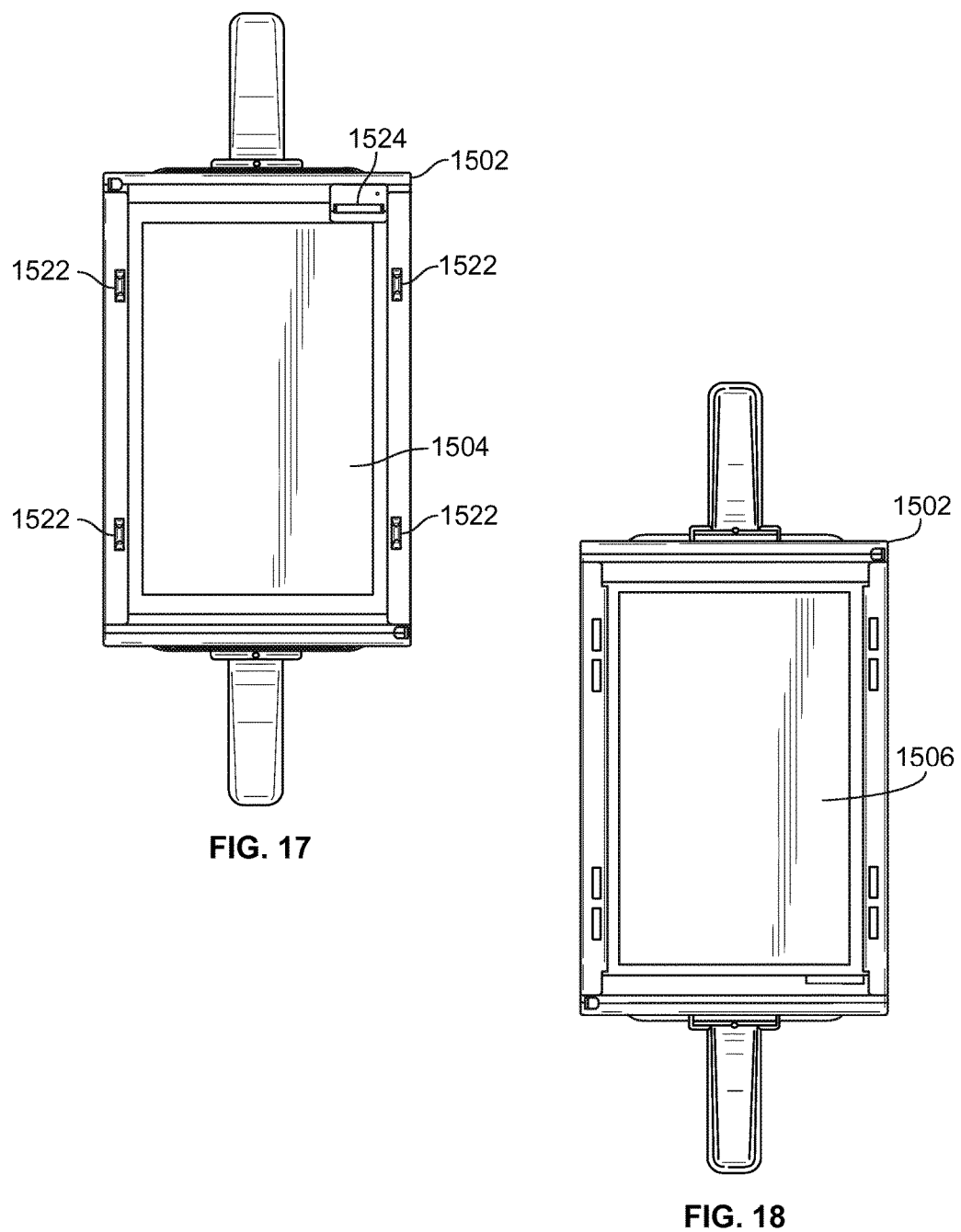

MODULAR HEATING UNIT

TECHNICAL FIELD

Aspects of the disclosure generally relate to a modular heating unit for storing food items. In particular, aspects of the disclosure allow for reconfiguration of a modular heating unit to accommodate different sized kitchens or food preparation layouts.

BACKGROUND

Various types of ovens or food warming units are used in the food industry. Such ovens and food warming apparatus allow precooked food items to be stored separately until needed. For instance, when a quick serve restaurant receives an order for a sandwich, the sandwich may be assembled on a food preparation table where the contents of certain sandwich items may be removed from food warning units. The storing of precooked foods in food warming units enables quick assembly of the sandwich and efficient order fulfillment.

Current ovens and food warming apparatus come in various fixed sizes but are not reconfigurable once installed. Such fixed dimensional heating units limit food preparation layouts which may have to be modified or altered for numerous reasons. For example, as quick serve restaurants add or change menus items, food preparation layouts may need to be adjusted. Fixed dimensional heating units limit the degree to which the food preparation layouts may be reconfigured.

Moreover, upon a kitchen remodeling existing fixed ovens and food warming apparatus may not be properly sized for the reconfigured kitchen. This may lead to the purchase of new ovens or warming apparatus at considerable expense or to undesirable or inefficient food preparation layout.

Thus, current fixed ovens and warming units are not satisfactory and a need exists for a more flexible apparatus.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

A first aspect the present disclosure provides a modular heating unit comprising a top cover, a base unit, and at least two modular heating bins configured to be arranged in different positions to accommodate different cooking space dimensions is disclosed. The modular heating bins may be operatively connected to the base unit and the top cover. The modular heating unit may be rearranged in different configurations through rearrangement of the modular heating bins.

Another aspect of the present disclosure provides a modular heating bin having a top wall, a bottom wall, a front wall, a back wall, and two side walls. In an embodiment, the two side walls interconnect the bottom wall and the top wall. The front wall may be connected to the two side walls and define a first opening configured to hold a pan. The back wall may also be connected to the two side walls and define a second opening configured to hold the pan. In an embodiment, the second opening extends through to the first opening from the front wall to the back wall. Moreover, the top wall further includes a plurality of tabs and slots configured for interconnecting the top wall and or bottom wall with another modular heating bin.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements and in which:

FIG. 5 illustrates another aspect of the disclosure in which a modular heating unit may include different sized modular heating bins in accordance with various aspects of the disclosure.

FIGS. 15-20 illustrate a modular heating bin in accordance with an aspect of the disclosure.

DETAILED DESCRIPTION

Figure 1:
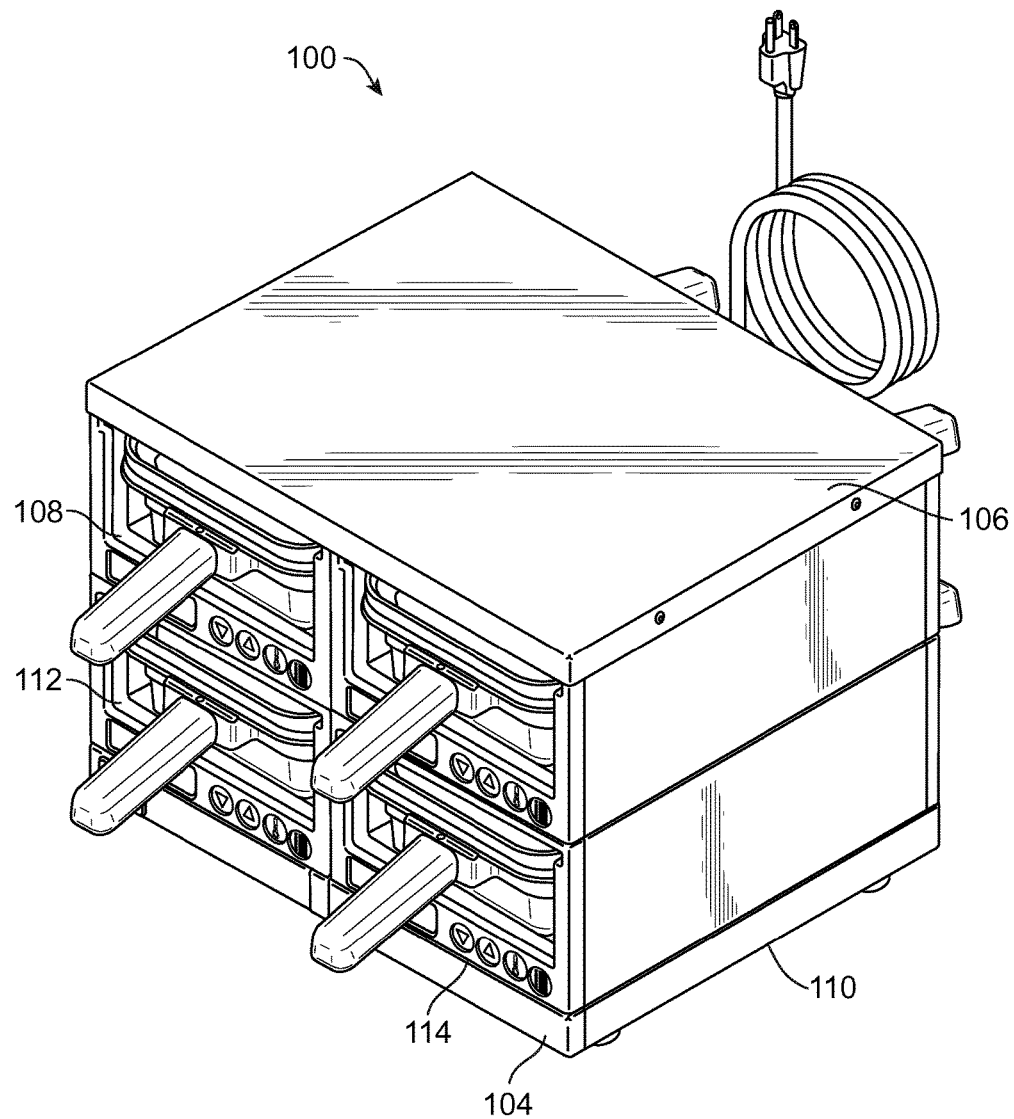
FIG. 1 illustrates a modular heating unit with four modular heating bins in accordance with various aspects of the disclosure.

Turning to the drawings, FIG. 1 illustrates a modular heating unit 100 that includes a base unit 104, a top cover 106, and four modular heating bins 108, 110, 112, and 114 interconnected between the base unit 104 and the top cover 106. The modular heating unit 100 illustrated in FIG. 1, is configured in a 2×2 arrangement. As illustrated, the four modular heating bins 108, 110, 112, and 114 may be arranged such that there are two columns and two rows of modular heating bins. In particular, the 2×2 configuration is shown such that modular heating bin 108 may be adjacent to modular heating bin 110 and modular heating bin 112 may be adjacent to modular heating bin 114. Moreover, as shown in FIG. 1, modular heating bin 108 may be stacked on top of modular heating bin 112 and modular heating bin 110 may be stacked on top of modular heating bin 114.

Figure 2:
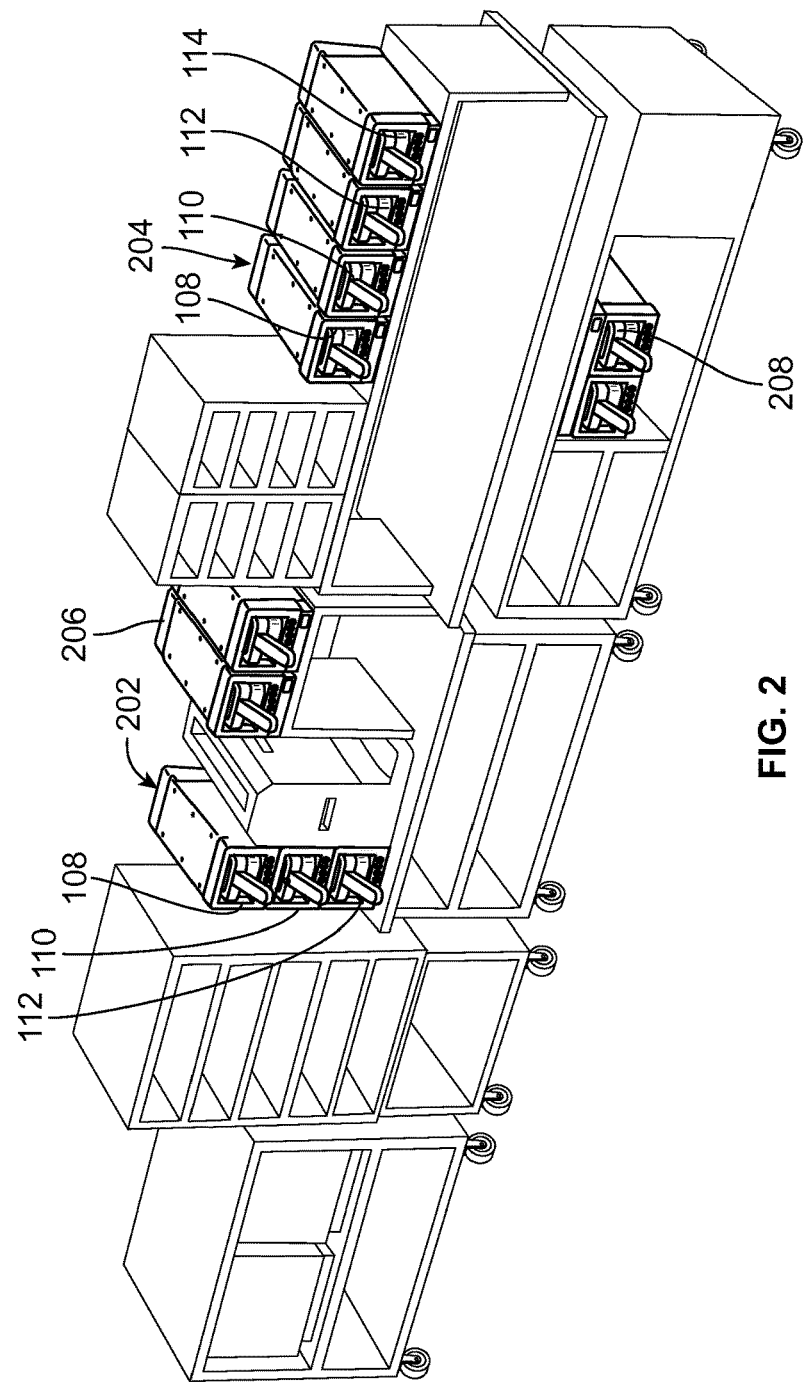
FIGS. 2-4 illustrate modular heating units in various positions that may be used in accordance with various aspects of the disclosure.
Figure 3:
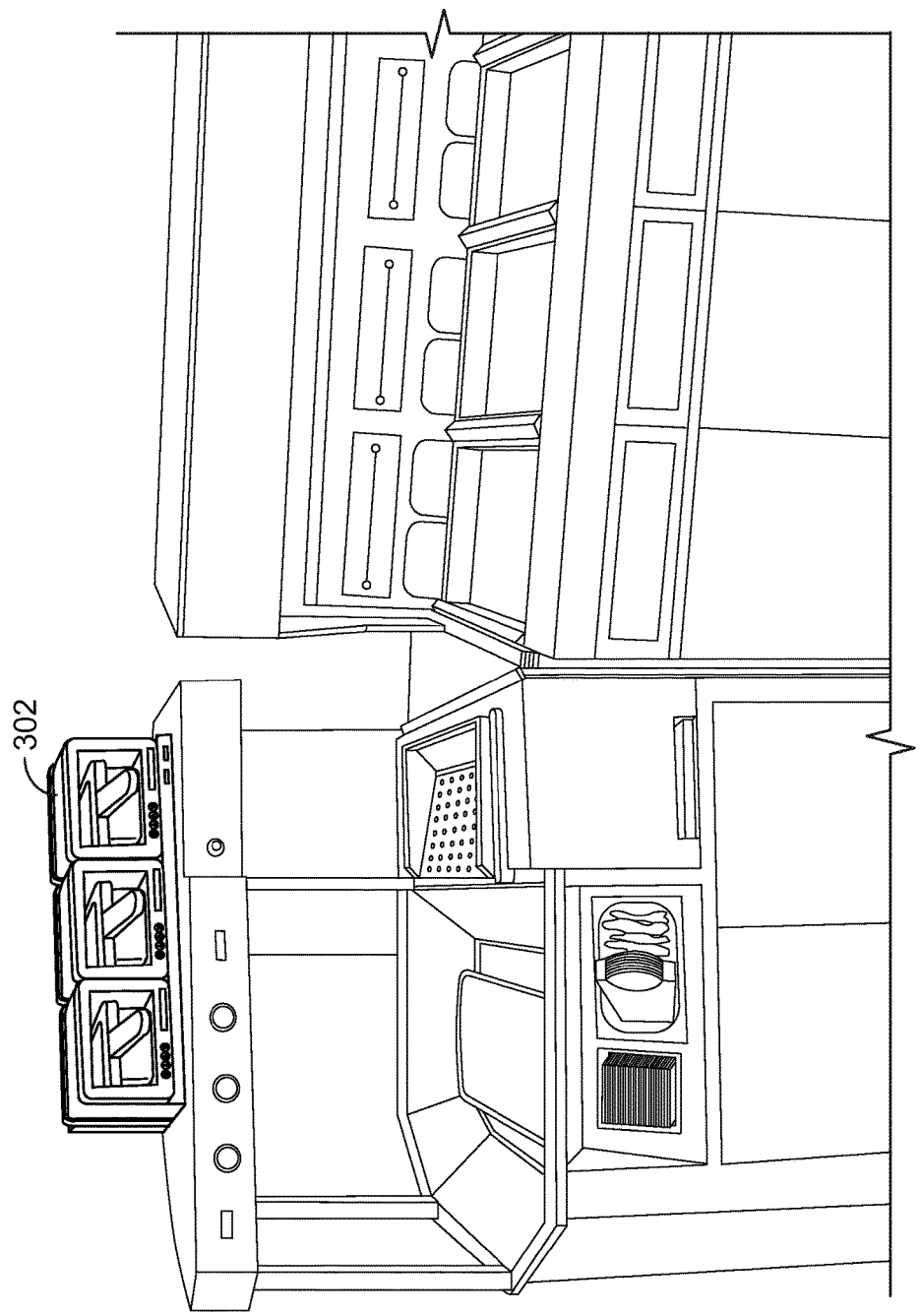
Figure 4:
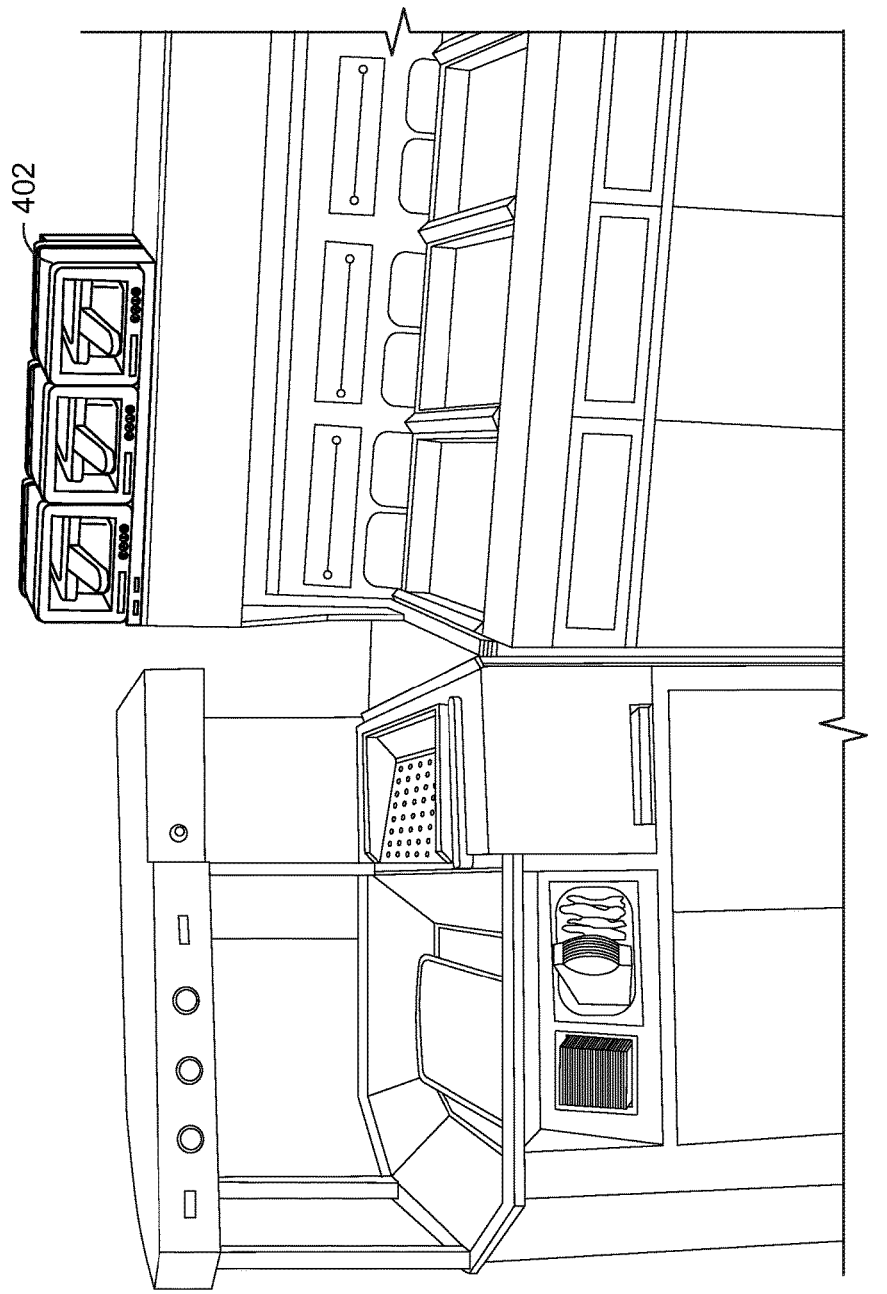

In an aspect of the disclosure, modular heating bins 108, 110, 112, and 114 are similarly sized and interchangeable with each other. Each of the modular heating bins 108, 110, 112, and 114 may be arranged into different positions in relation to each other to accommodate different cooking space dimensions. For instance, modular heating bins 108, 110, and 112 may be configured in a 1×3 arrangement (a vertical stack) as shown in FIG. 2 by modular heating unit 202. As illustrated, modular heating unit 202 may be positioned on a preparation table next to other cooking equipment such as a bun toaster. In another embodiment, modular heating bins 108, 110, 112, and 114 may be configured in a 4×1 arrangement (horizontal stack) as shown in FIG. 2 by modular heating unit 204. As illustrated, modular heating unit 204 may be positioned above a food preparation table. Furthermore, as shown in FIGS. 2 through 4, modular heating units such as modular heating units 206, 208, 302, and 402 may be positioned above, below, or on numerous cooking apparatus (fryers, salt shakers, grills, etc.) depending on the particular kitchen design.

FIG. 5 illustrates another aspect of the disclosure in which a modular heating unit may include different sized modular heating bins. For instance, FIG. 5 shows modular heating unit 500 which includes modular heating bins 502, 504, and 506. In an embodiment, modular heating bins 502 and 504 have the same physical dimensions and are both sized for holding a one-third sized storing pan. However, as illustrated in FIG. 5, modular heating bin 506 is a larger modular heating bin as compared to modular heating bins 502 and 504. In an embodiment, modular heating bin 506 may be sized to hold a one-half sized storing pan. In an aspect of the disclosure, the modular heating bins disclosed in the present disclosure may be differently sized but each of the modular heating bins may be operatively interconnected with each other to form varying modular heating units.

For instance, in an aspect of the disclosure, numerous modular heating bins may be arranged in different configurations to accommodate different kitchen layouts and designs. In an embodiment, the modular heating bins may be interconnected to each other and positioned between a top cover and a base unit. The base unit 104 and the top cover may be sized to accommodate the particular arrangement of the formed modular heating unit. In an embodiment, different sized modular heating bins may be stacked on top of or positioned next to each other.

Figure 6:
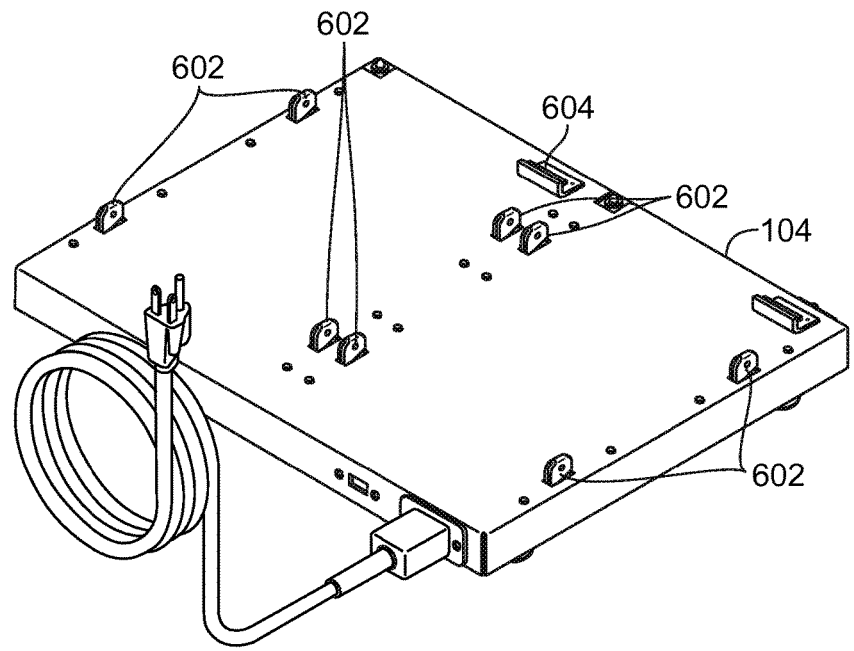
FIG. 6 illustrates a base unit in accordance with various aspect of the disclosure.

FIG. 6 illustrates a base unit 104 in accordance with various aspects of the disclosure. Base unit 104 includes mounting tabs 602 for receiving modular heating bins such as modular heating bins 112 and 114. In an embodiment, mounting tabs 602 may be vertically extending structures having varying shapes for insertion into a mated slot located on a modular heating bin. Those skilled in the art will realize that the mounting tabs may be of numerous shapes which may include circular, oval, rectangle, square, triangular, and other geometric shapes or non-uniform shapes.

In an embodiment, mounting tabs 602 may provide for secure positioning of each of the modular heating bins 112 and 114. For instance, mounting tabs 602 may be inserted into bottom slots of each of the modular heating bins. In an embodiment, after the mounting tabs 602 have been inserted into the bottom slots of the modular heating bins, the modular heating bins may be slid into a locked position. In an embodiment, the modular heating bins are releasably connected to the base unit 104. Those skilled in the art will realize that other locking mechanisms may be used to securely connect each of the modular heating bins to base unit 104.

FIG. 6 further illustrates a connector 604 which may be used to operatively connect base unit 104 to a modular heating bin. The connector 604 may provide power and communication signals to each of the connected modular heating bins. Connector 604 may connect power and control circuitry that may be housed in base unit 104. For example, base unit 104 may include a processor for controlling overall operation of the connected modular heating bins. Moreover, base unit 104 may include other components such as RAM, ROM, network interfaces, other communication interfaces, and additional storage components for providing overall control and monitoring functions to each of the connected modular heating bins. Base unit 104 may also include power circuitry for providing the proper voltage and current requirements of the connected modular heating units.

In another embodiment, each modular heating bin may also include a processor memory, and control circuitry. Moreover, each modular heating bin may also include various communication interfaces and ports such as Ethernet ports or USB ports to enable communication with internal or external networks.

Figure 7:
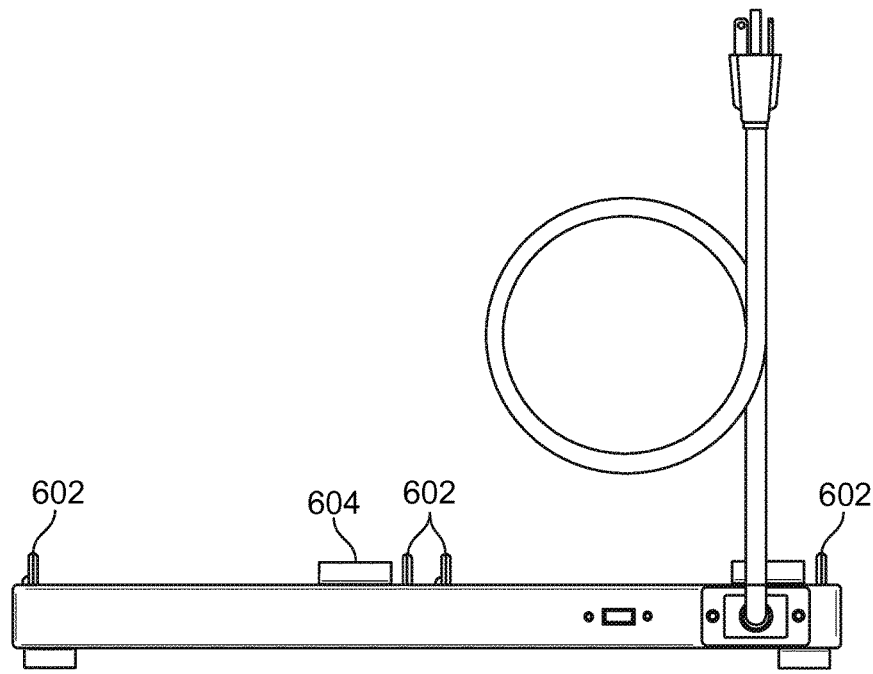
FIGS. 7-9 illustrate additional views of a base unit in accordance with various aspects of the disclosure.
Figure 8:
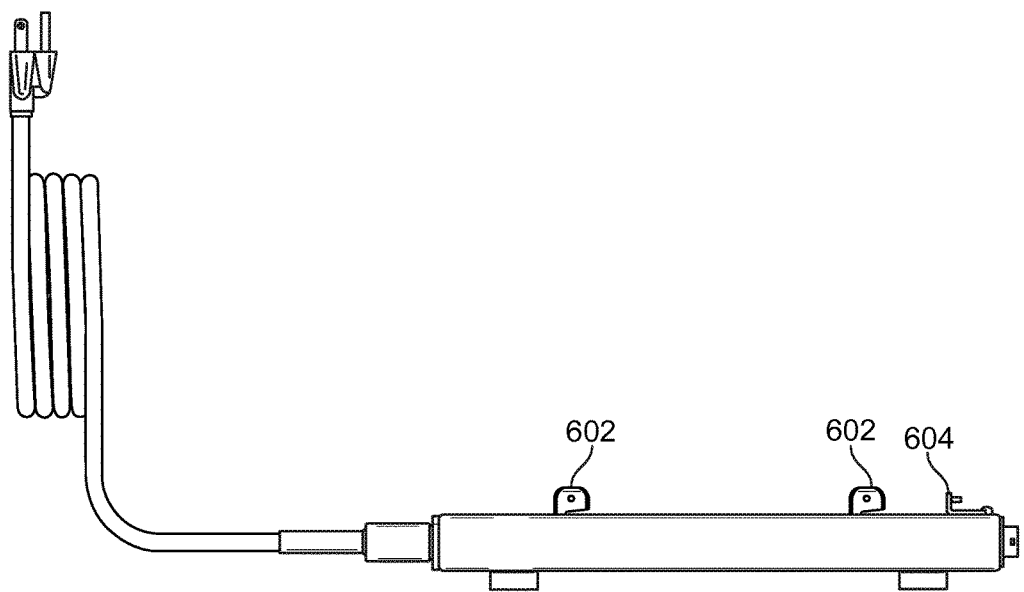
Figure 9:
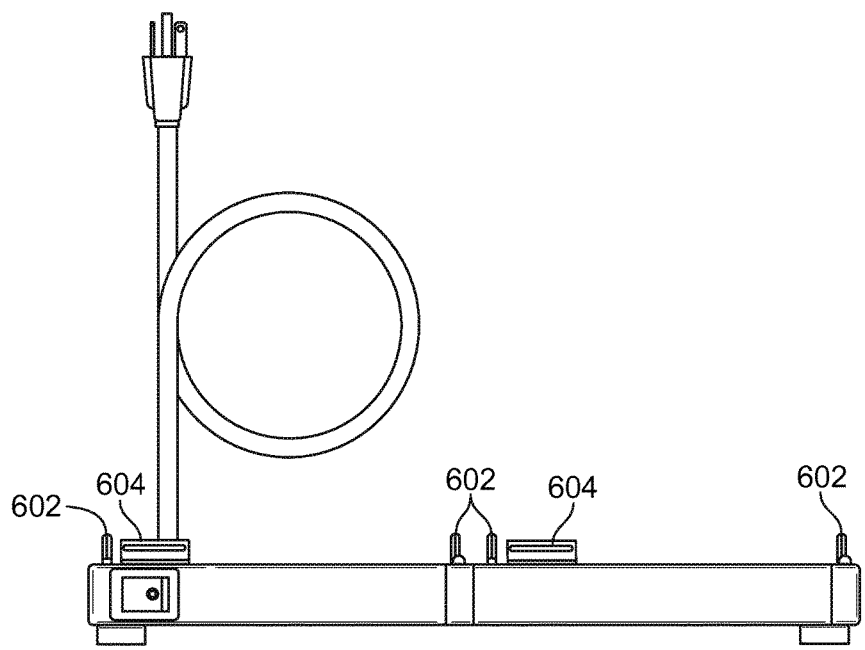

FIGS. 7-9 illustrate additional views of a base unit such as base unit 104 in accordance with various aspects of the disclosure. In FIG. 9, a power switch 902 may be included on base unit 104 to allow for connection to a power source. In addition, power switch 902 may be used to disconnect power to each of the connected modular heating bins prior to any removal from base unit 104 or for servicing and/or cleaning.

In an embodiment, base unit 104 may include input devices for connecting external devices such as keypads, touchscreens, speakers or other display or audio devices. In an embodiment, base unit 104 may operate in a networked environment with other modular heating units or food preparation equipment. In an embodiment, base unit 104 may support connection to external or remote computing devices. Base unit 104 may include connections and interfaces for connection to a wide area network (WAN), local area network (LAN) or other network suitable for connecting to the internet or alike. For instance, base unit 104 may include communications ports such as Ethernet ports, USB ports, or the like for connection to external networks using various well-known protocols such as TCP/IP, FTP, HTTP and the like.

In an embodiment, memory and storage included in base unit 104 may include an operating system, computer-executable instructions, and/or application programs for execution by the processor.

In an embodiment, base unit 104 may also include a wireless transceiver for communication with connected modular heating bins and/or external control or monitoring devices. The wireless transceiver may communicate additional control features or program updates to each of the connected modular heating bins.

Figure 10:
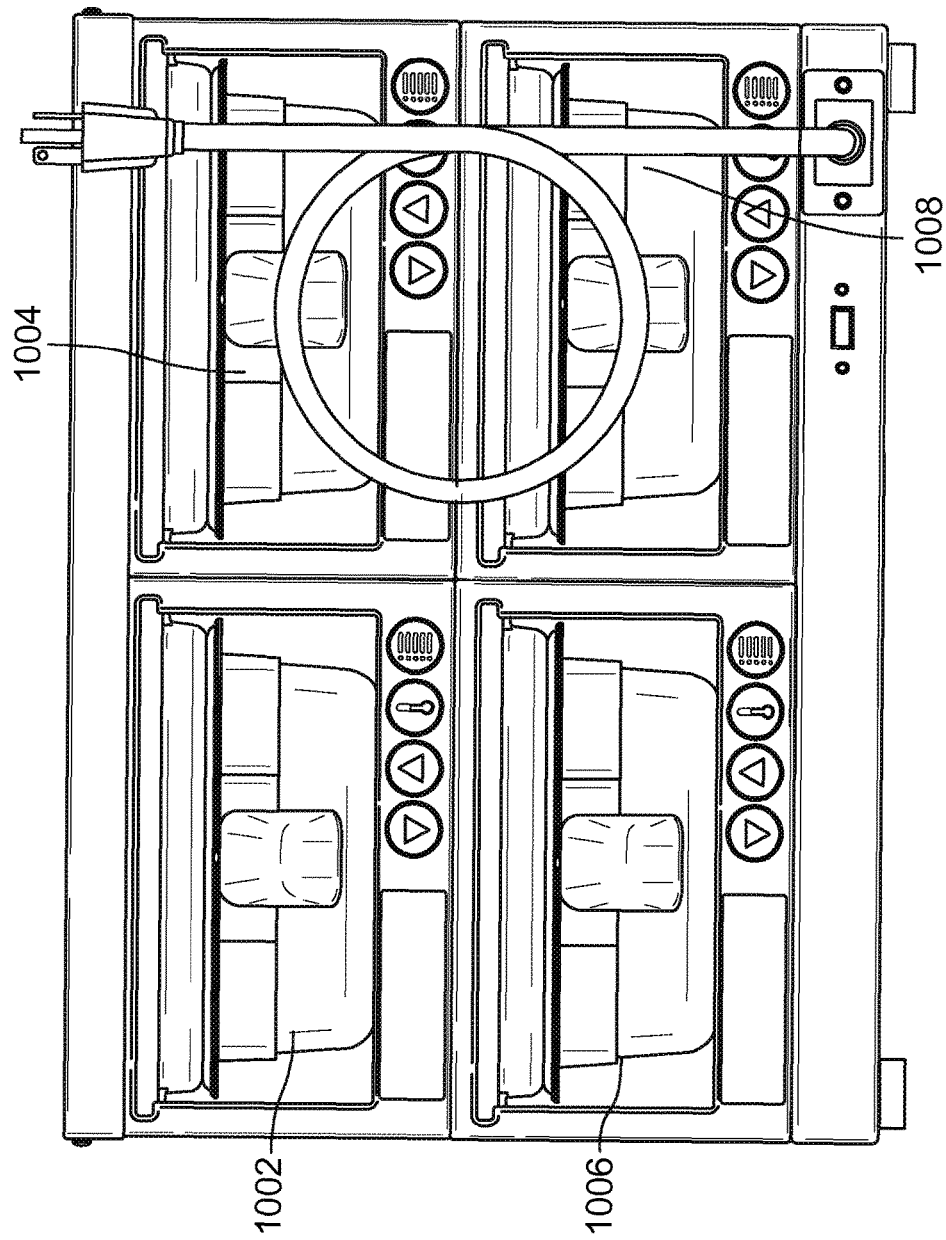
FIGS. 10-14 illustrate various additional views of a modular heating unit in accordance with various aspects of the disclosure.
Figure 12:
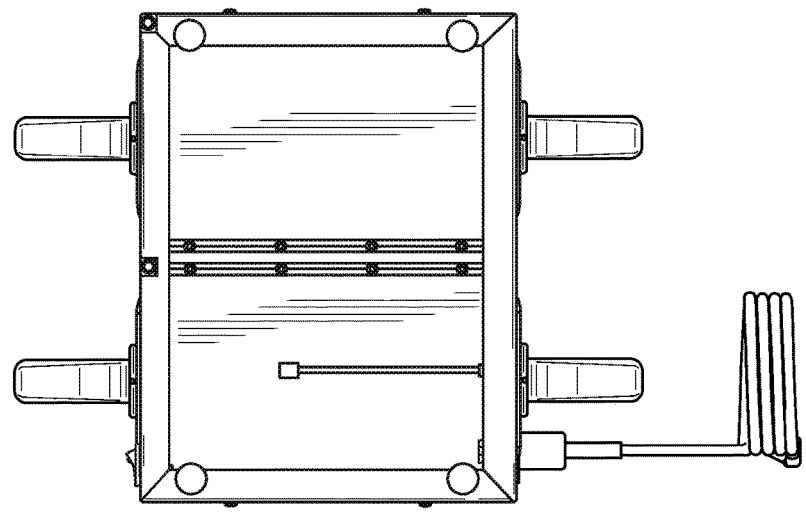
Figure 11:
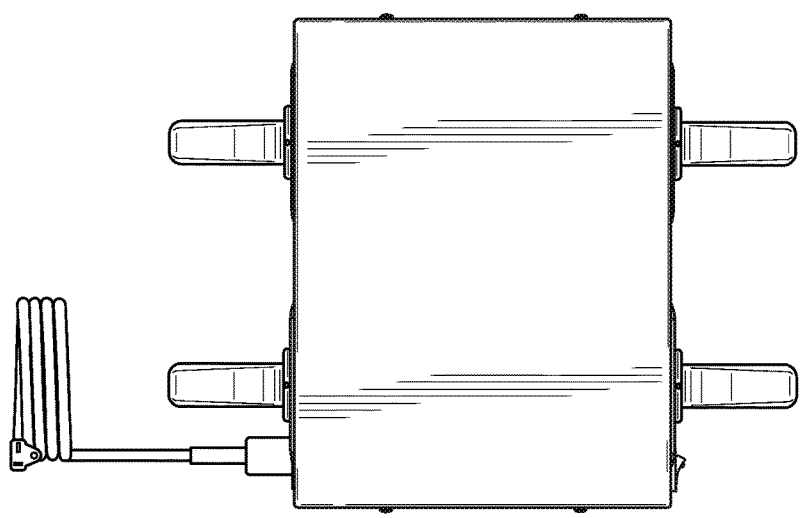
Figure 13:
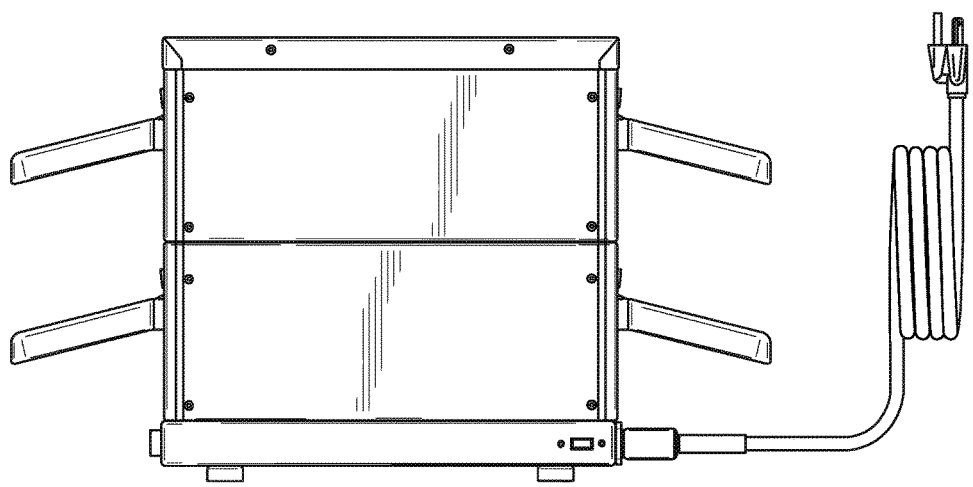
Figure 14:
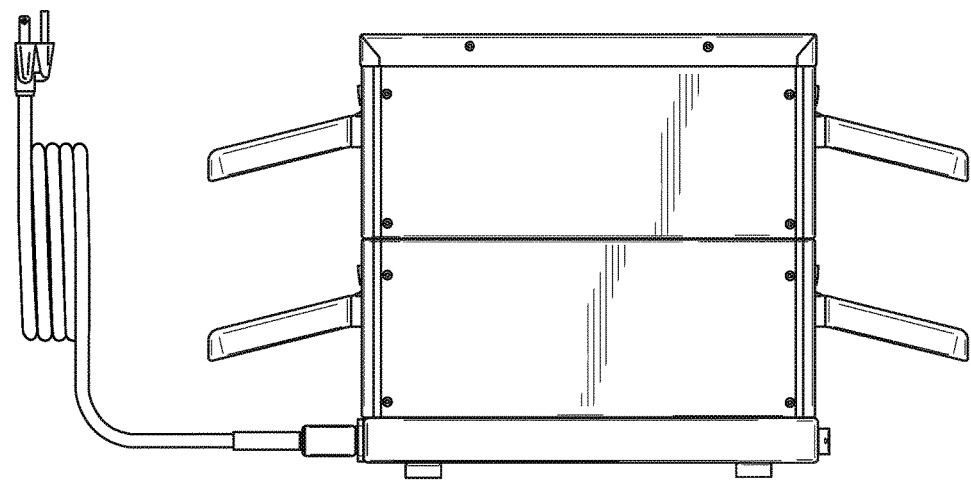

FIGS. 10-14 illustrate various additional views of a modular heating unit in accordance with various aspects of the disclosure. In particular, FIG. 10 shows a back view of a modular heating unit such as modular heating unit 100. In an embodiment, the back view of modular heating unit 100 may be similar to the front view of modular heating unit 100 as shown in FIG. 1. In an aspect of the disclosure, inserted pans such as pans 1002, 1004, 1006, and 1008 may be accessed from both the front and back sides of the modular heating unit 100. In an embodiment, each of the connected modular heating bins 108-114 may also be monitored and controlled from both sides of modular heating unit 100 as modular heating bins 108-114 have similar functionality on both sides of modular heating unit 100. FIGS. 11-12 illustrate top and bottom views of a modular heating unit in accordance with various aspects of the disclosure. FIGS. 13-14 illustrate side views of a modular heating unit in accordance with various aspects of the disclosure.

Figure 15:
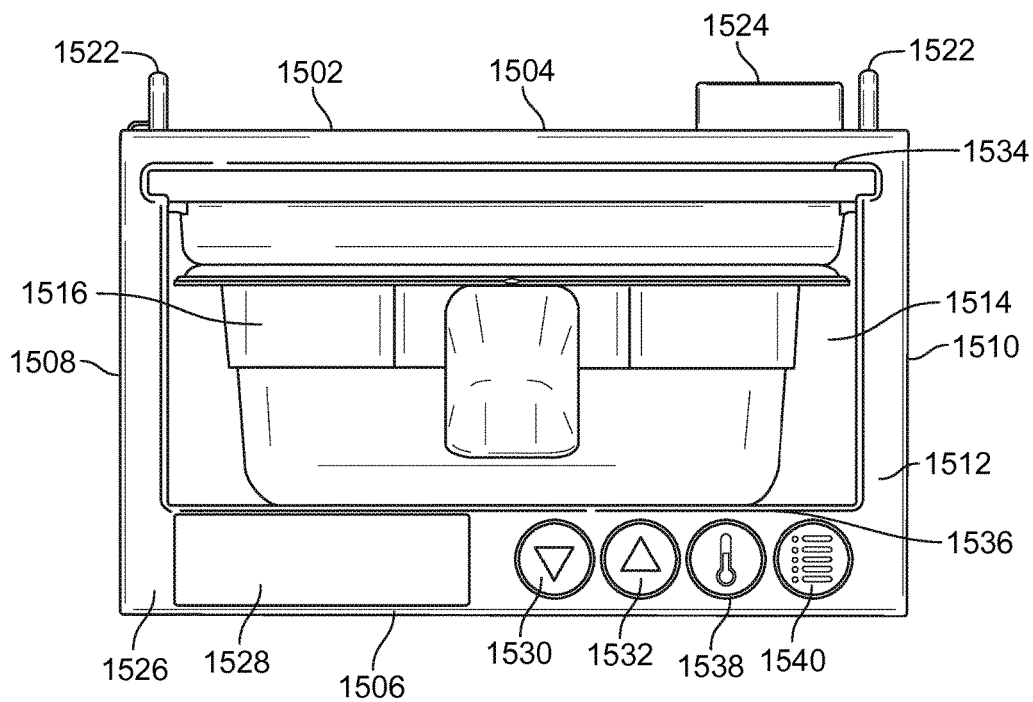

FIGS. 15-20 illustrate a modular heating bin in accordance with an aspect of the disclosure. In FIG. 15, a modular heating bin 1502 may include a top wall 1504 and a bottom wall 1506. In an embodiment, top and bottom walls 1502 and 1504 may be opposite each other and may be interconnected to each other through two side walls such as side walls 1508 and 1510. A front wall such as front wall 1512 may be connected to the side walls 1508 and 1510, the top wall 1504, and the bottom wall 1506. In an embodiment, front wall 1510 may include or define a first opening 1514 to hold a pan 1516. A back wall such as back wall 1518 (FIG. 16) may be connected to side walls 1508 and 1510, top wall 1504, and bottom wall 1506.

In an aspect of the disclosure, back wall 1518 may include or define a second opening 1520 to hold pan 1516. In an embodiment, the second opening 1520 may extend through to the first opening 1514 from the front wall 1512 to the back wall 1518.

As shown in FIG. 15, top wall 1504 may include a plurality of mounting tabs 1522 for interconnecting modular heating bin 1502 with other modular heating bins. In an embodiment, mounting tabs 1522 may provide for securing modular heating bin 1502 to a top cover or to another modular heating unit. For instance, mounting tabs 1522 may be inserted into bottom slots of another modular heating bin. In an embodiment, modular heating bin 1502 may be releasably connected to a top cover or another modular heating unit.

In an embodiment, modular heating bin 1502 may be used without a top cover. In such an embodiment, mounting tabs such as mounting tabs 1522 may be removable.

FIG. 15 illustrates a connector 1524 which may be used to operatively connect modular heating unit 1502 to another modular heating unit. The connector 1524 may provide power and communication to modular heating bin 1502.

Figure 16:
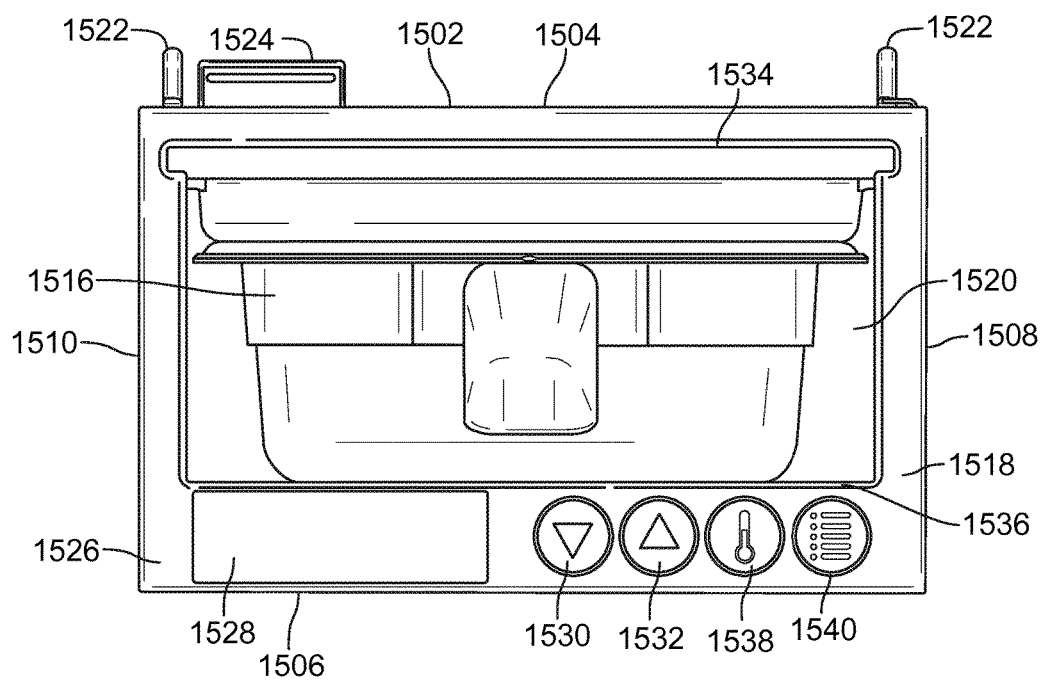
Figure 19:
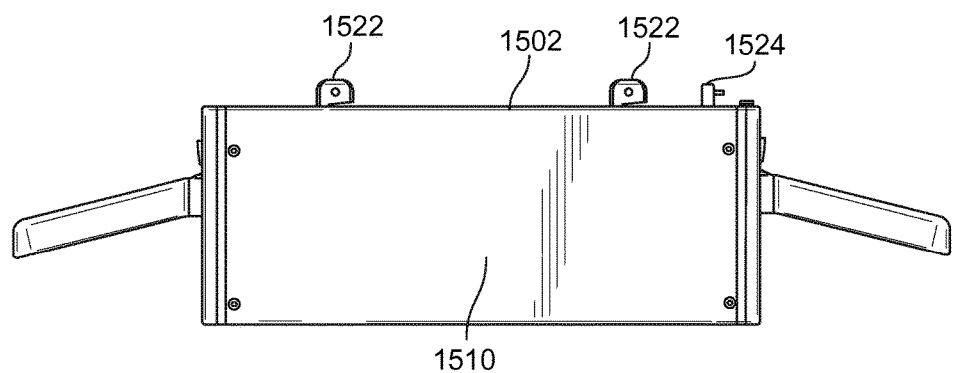
Figure 20:
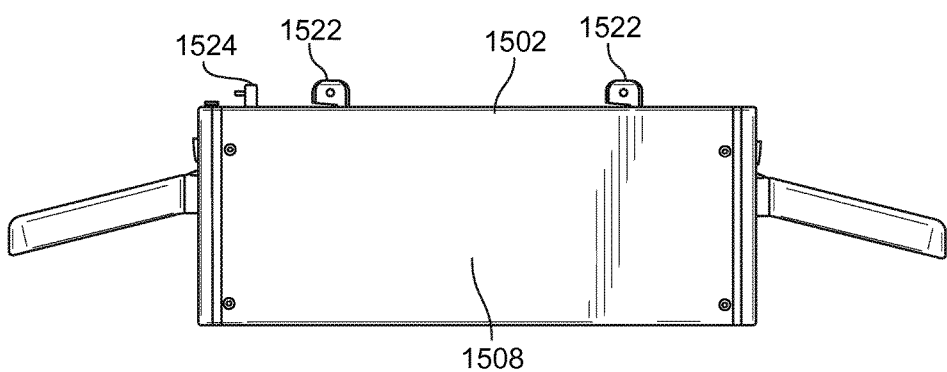

FIGS. 15 and 16 illustrate an interface 1526 that may be included in front wall 1512 and back wall 1518. The interface 1526 may include a display 1528 for displaying information regarding operation of modular heating bin 1502. The information displayed may include identifying contents stored in pan 1516 placed in modular heating bin 1502. For instance, display 1528 may list the contents of pan 1516 as grilled or fried. More specifically, display 1528 may show or list the type of food stored, the temperature of the food stored, the amount of time the food has been stored, and a countdown until spoilage of the stored food. Those skilled in the art will realize that numerous types of different information and messages may be displayed on display 1528 based in part on the food being stored in modular heating bin 1502.

In an aspect of the disclosure, interface 1526 may also include different controls for changing operational variables of modular heating bin 1502. For instance, interface 1526 may include up arrow button 1530 and down arrow button 1532 for changing set points of top and bottom integral heaters 1534 and 1536 that may be included in modular heating unit 1502. In an aspect of the disclosure, integral heaters 1534 and 1536 may be embedded in top wall 1504 and bottom wall 1506. In an embodiment, the integral heaters 1534 and 1536 may be foil heaters, wire rope heaters, or other type of heaters including heaters printed on glass type surfaces.

In another aspect of the disclosure, interface 1526 may also include buttons or input controls for displaying temperature information or food contents information. For example interface 1526 may include a food temperature button 1538 and contents information button 1540.

Figure 21:
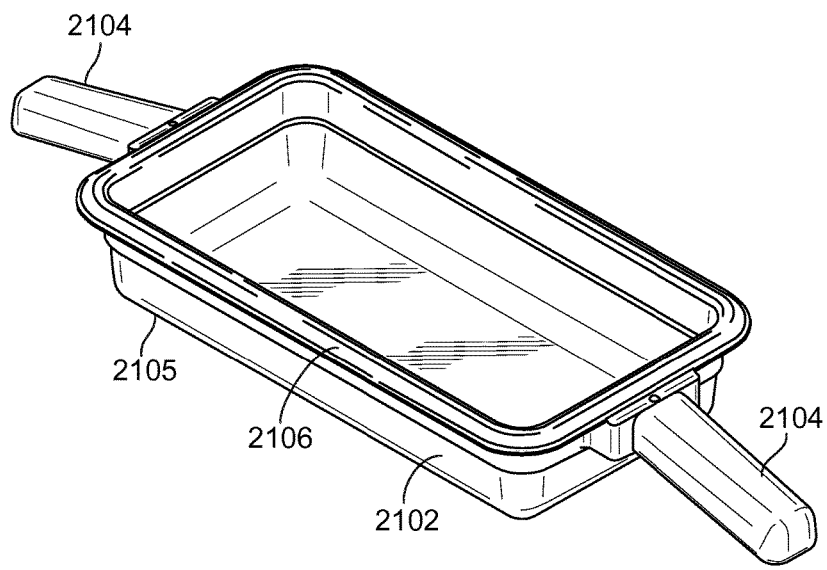
FIG. 21 illustrates a one-third sized pan that may be used in various embodiments of the disclosure.

FIG. 21 illustrates a one-third sized pan 2102 that may be used in various embodiments of the disclosure. In FIG. 21, one-third sized pan 2102 is shown with handles 2104 on each end of the one-third sized pan 2102 so that the one-third sized pan 2102 may be removed from either side of a modular heating unit. One-third sized pan 2102 may include a bottom portion 2105 which extending vertically upwards and attaches to an integrally formed lip portion 2106 which runs along an outer most portion of one-third sized pan 2102.

Figure 22:
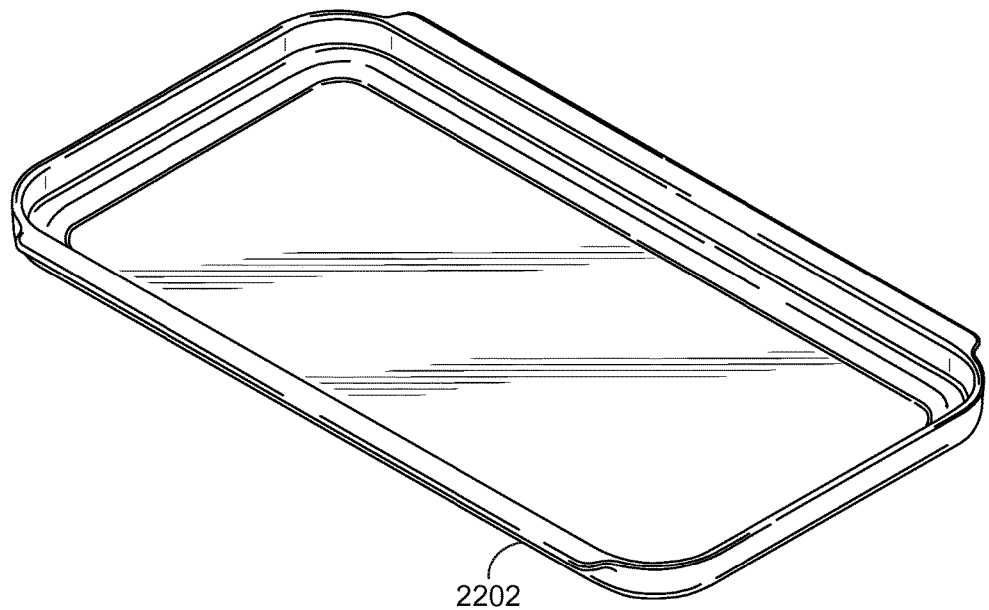
FIG. 22 illustrates a cover that may be used in various aspects of the disclosure.

FIG. 22 illustrates a cover 2202 for one-third sized pan 2102 shown in FIG. 21. Cover 2202 may be used and placed on one-third sized pan 2102 based on the contents stored in one-third sized pan 2102.

Figure 23:
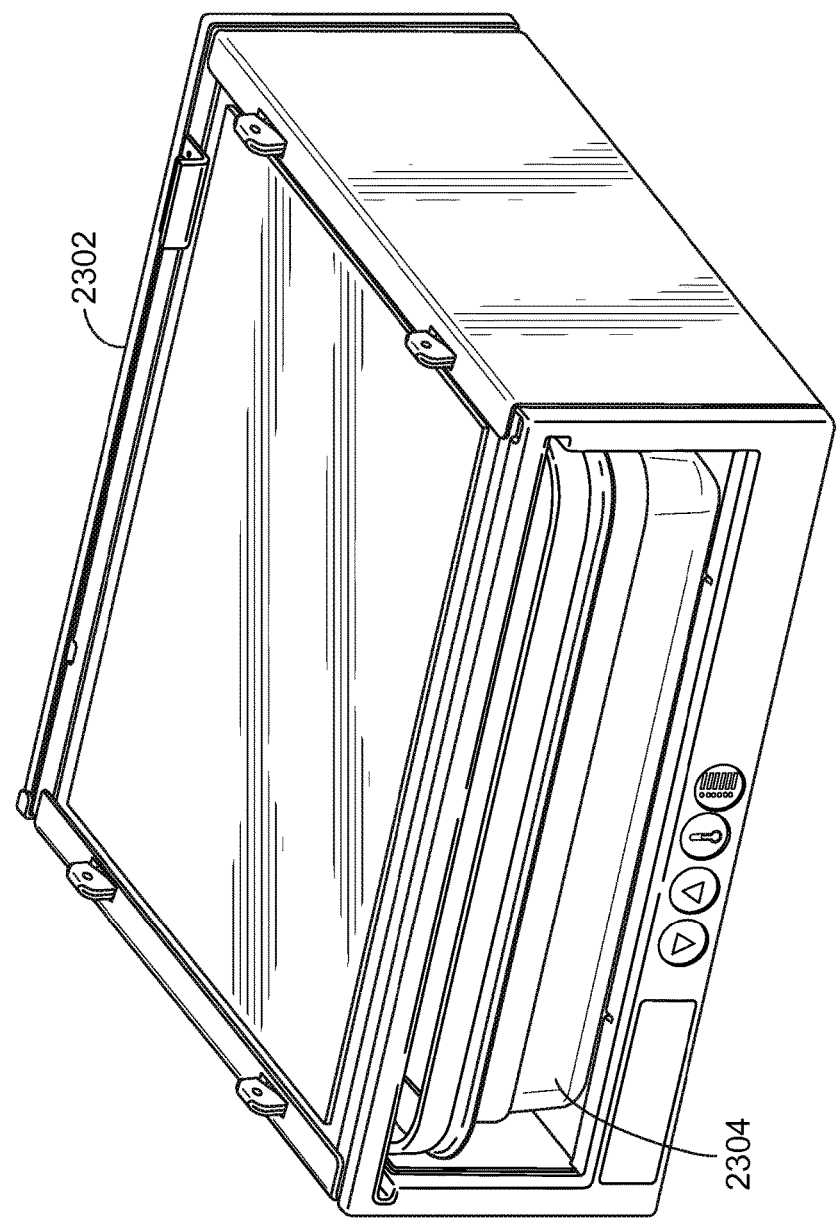
FIG. 23 illustrates a modular heating bin in accordance with an aspect of the disclosure.

FIG. 23 illustrates a modular heating bin 2302 in accordance with an aspect of the disclosure. In FIG. 23, modular heating bin 2302 may hold a half-sized pan such as half-sized pan 2304. Modular heating bin 2302 may be operatively interconnected with other modular heating bins such as modular heating 108, 110, 112, and 114. In an embodiment, a base unit such base unit 104 may be differently sized to accommodate connection of differently sized modular heating bins. In another aspect of the disclosure, a top cover such as top cover 106 may also be sized to fit differently sized modular heating bins. Arrangements of differently sized heating bins and there interconnection to each other to form a singular modular heating unit are discussed below.

Figure 24:
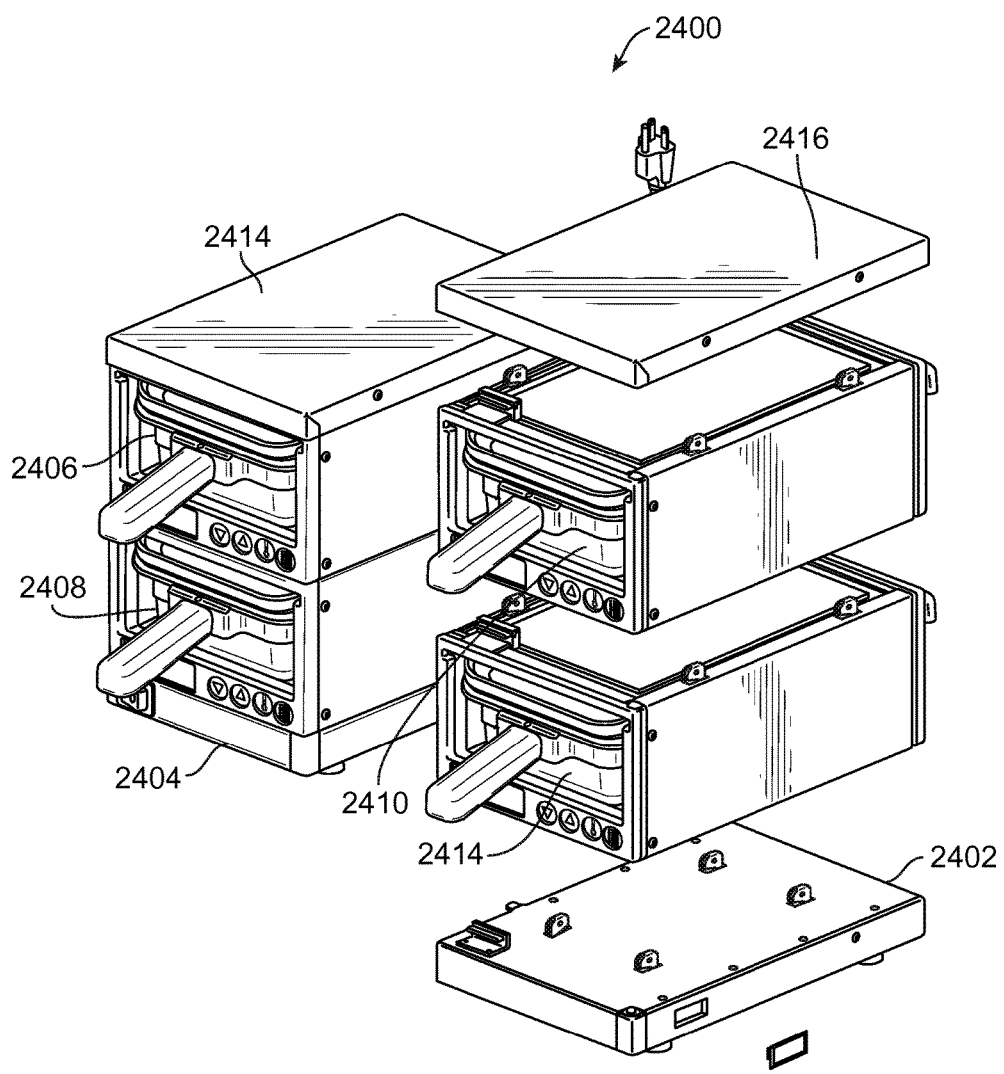
FIG. 24 illustrates a modular heating unit in accordance with an aspect of the disclosure.

FIG. 24 illustrates a modular heating unit 2400 in accordance with an aspect of the disclosure. In FIG. 24, modular heating unit 2400 may comprise two interconnected base units such as base unit 2402 and 2404. In an embodiment, the two interconnected base units 2402 and 2404 may when interconnected act as a single base unit such as base unit 104. In an embodiment, one of the interconnected base units may act as a slave base unit while the other base unit when interconnected may act as a master unit. Such a configuration may reduce overall power consumption when interconnected but also allow for redundancy or fail over should the master base unit encounter a problem such as a component failure. In addition, such a system may allow for standardization of the internal components of the base unit regardless of the overall physical dimensions of the base unit.

In an embodiment, if a kitchen or food assembly line is remodeled or altered additional modular heating bins with associated base units may be interconnected with an existing modular heating unit to expand or resize the overall configuration of the modular heating unit. Such an interconnected system may function as a single modular heating unit though comprised of equipment potentially purchased at different times for different kitchen or assembly line layouts.

FIG. 24 further illustrates four modular heating bins 2406, 2408, 2410, and 2412. The modular heating unit 2400 of FIG. 24 may be arranged in a 2×2 configuration in which modular heating bin 2406 is connected or stacked on top of modular heating bin 2408. Similarly, as shown in FIG. 24, modular heating bin 2410 may be connected or stacked on top of modular heating bin 2412. Top covers such as top covers 2414 and 2416 may be placed on top of modular heating bin 2406 and 2410. In an embodiment, top cover 2414 and 2416 may be connected together to form a singular top cover. In another embodiment, a single unitary top cover (not shown) may be used to attach to modular heating bins 2406 and 2410.

Figure 25:
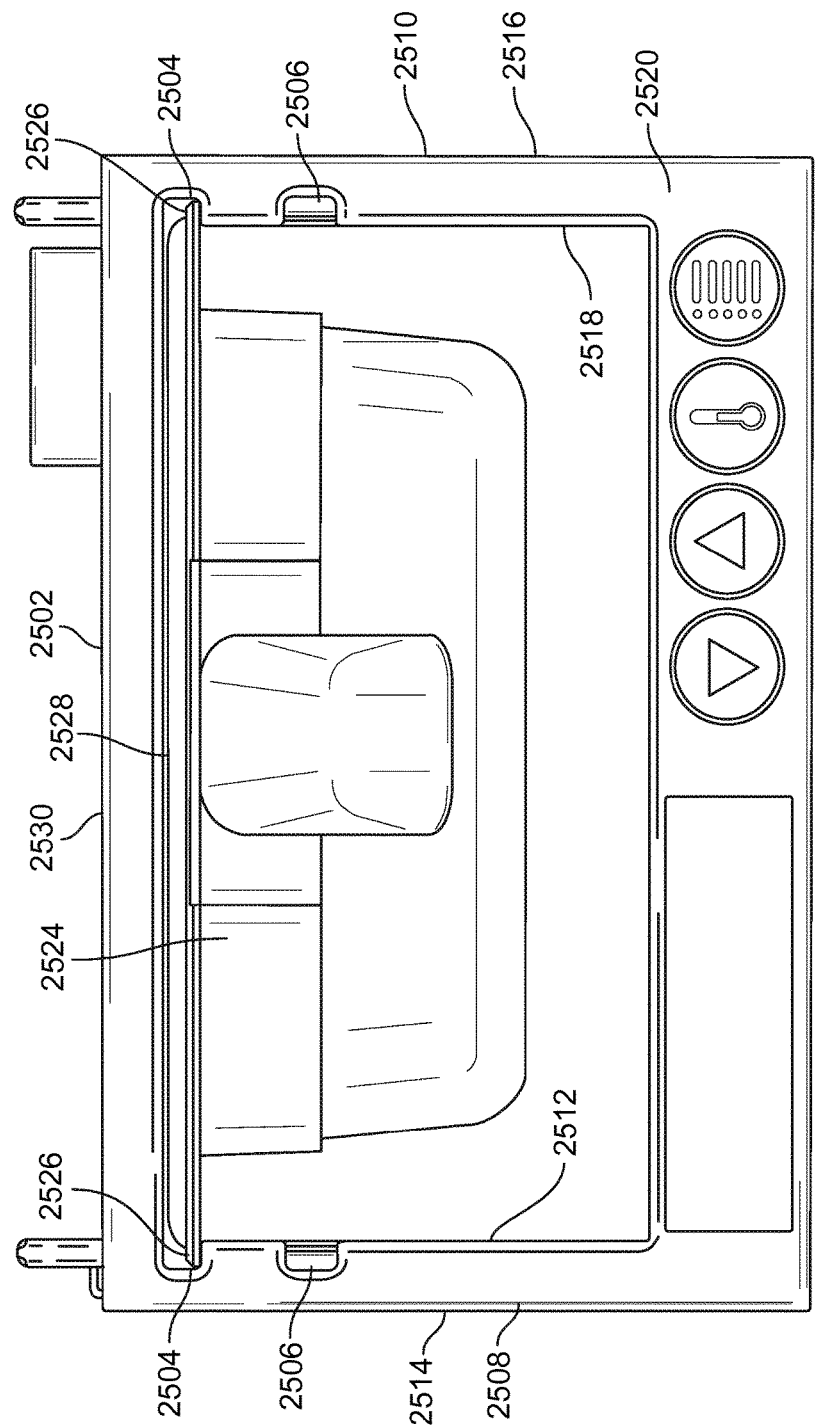
FIG. 25 illustrates a rail system in accordance with an aspect of the disclosure.

FIG. 25 illustrates a rail system in accordance with an aspect of the disclosure. In FIG. 25, a modular heating bin 2502 is illustrated which includes a first rail structure 2504 and a second rail structure 2506. The first and second rail structures may form grooves or slots in each of side walls 2508 and 2510 of modular heating bin 2502. In an embodiment, the first and second rail structures 2504 and 2506 may be formed between an inner surface and outer surface of each of the side walls. For example, side wall 2508 may comprise an inner surface 2512 and an outer surface 2514 and side wall 2510 may include an inner surface 2518 and an outer surface 2516.

In an embodiment, rail structure 2504 may be formed between inner surface 2512 and outer surface 2514 of side wall 2508, and between inner surface 2518 and outer surface 2516 of side wall 2510. In another embodiment, rail structure 2506 may be formed between inner surface 2512 and outer surface 2514 of side wall 2508, and between inner surface 2518 and outer surface 2516 of side wall 2510.

Figure 26:
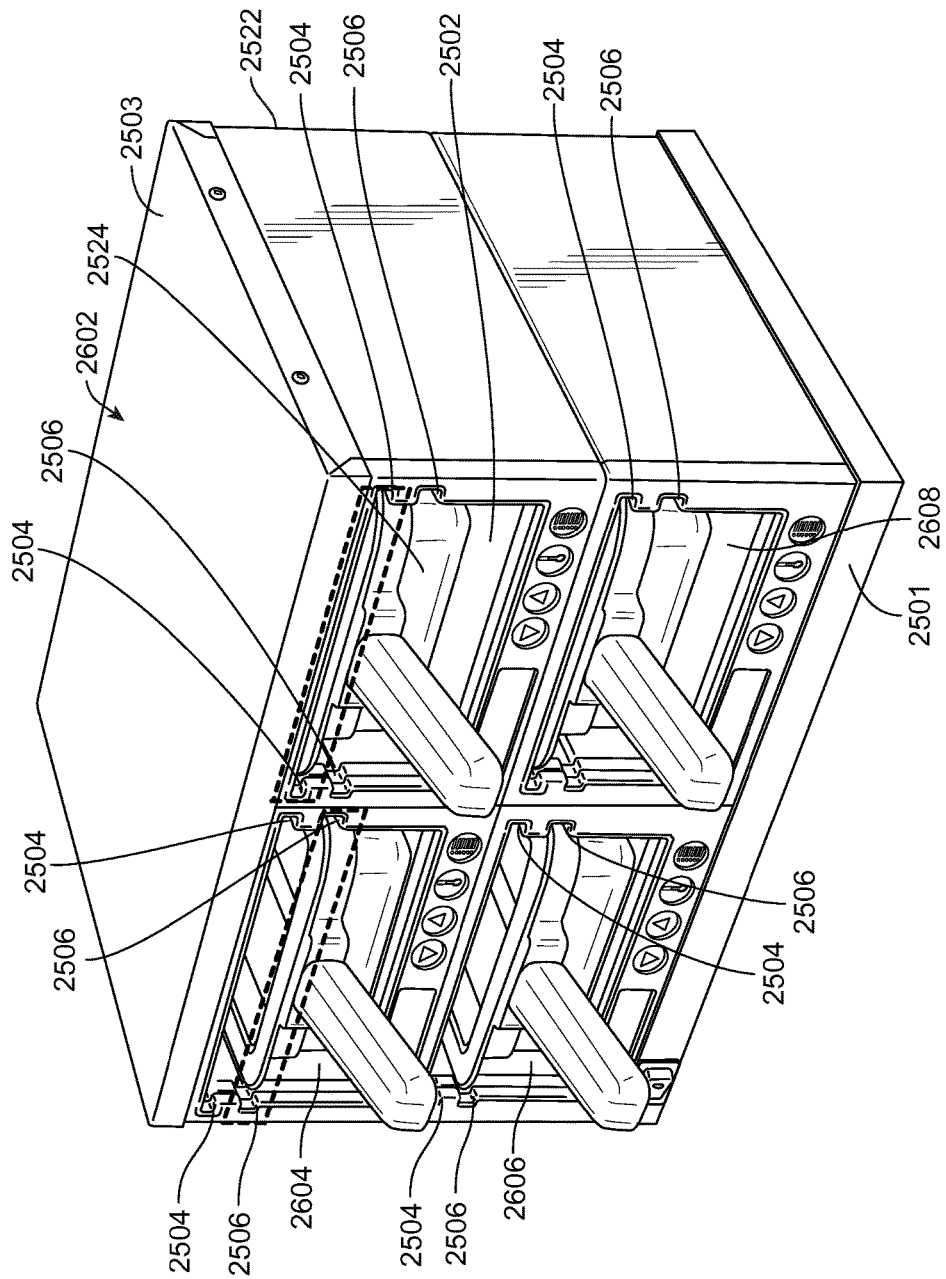
FIG. 26 illustrates additional rail assemblies that may be incorporated into modular heating bins in accordance with various aspects of the disclosure.

In an aspect of the disclosure, each of the rail structures 2504 and 2506 may extend from a front wall 2520 to a back wall 2522 (FIG. 26). In an aspect of the disclosure, a pan such as pan 2524 may include a lip 2526 that extends around the outermost portion of pan 2524. In an embodiment, lip 2526 may engage and slide along rail assembly 2504 such that pan 2524 is securely stored in modular heating bin 2502.

In an aspect of the disclosure, when pan 2524 is inserted into rail assembly 2504 a seal is formed against an internal upper surface 2528 of top portion 2530 of modular heating bin 2502. In an embodiment, the seal may prevent venting of pan 2524 so that products placed in pan 2524 retain moisture prior to food preparation. Rail assembly 2504 may replace the need for a cover for pan 2524.

In another embodiment, rail assembly 2506 may be used to store pan 2524 when crispy or fried food items are stored in pan 2524. Rail assembly 2506 may be positioned such that pan 2524 vents to atmosphere in the space created between the top of pan 2524 and internal upper surface 2528 of top portion 2530.

FIG. 26 illustrates rail assemblies 2504 and 2506 incorporated into numerous modular heating bins such as modular heating bins 2506, 2604, 2606, and 2608. Interconnected modular heating bins 2506, 2604, 2606, and 2608 along with base unit 2501 and top cover 2503 may form modular heating unit 2602. As illustrated, pans such as pan 2524 may be inserted into rail assemblies 2504 and 2506 based on whether the food contents stored in each particular pan should be vented or sealed. As shown in FIG. 26, covers for each of the modular heating bins 2506, 2604, 2606, and 2608 may not be necessary in such an embodiment.

Figure 27:
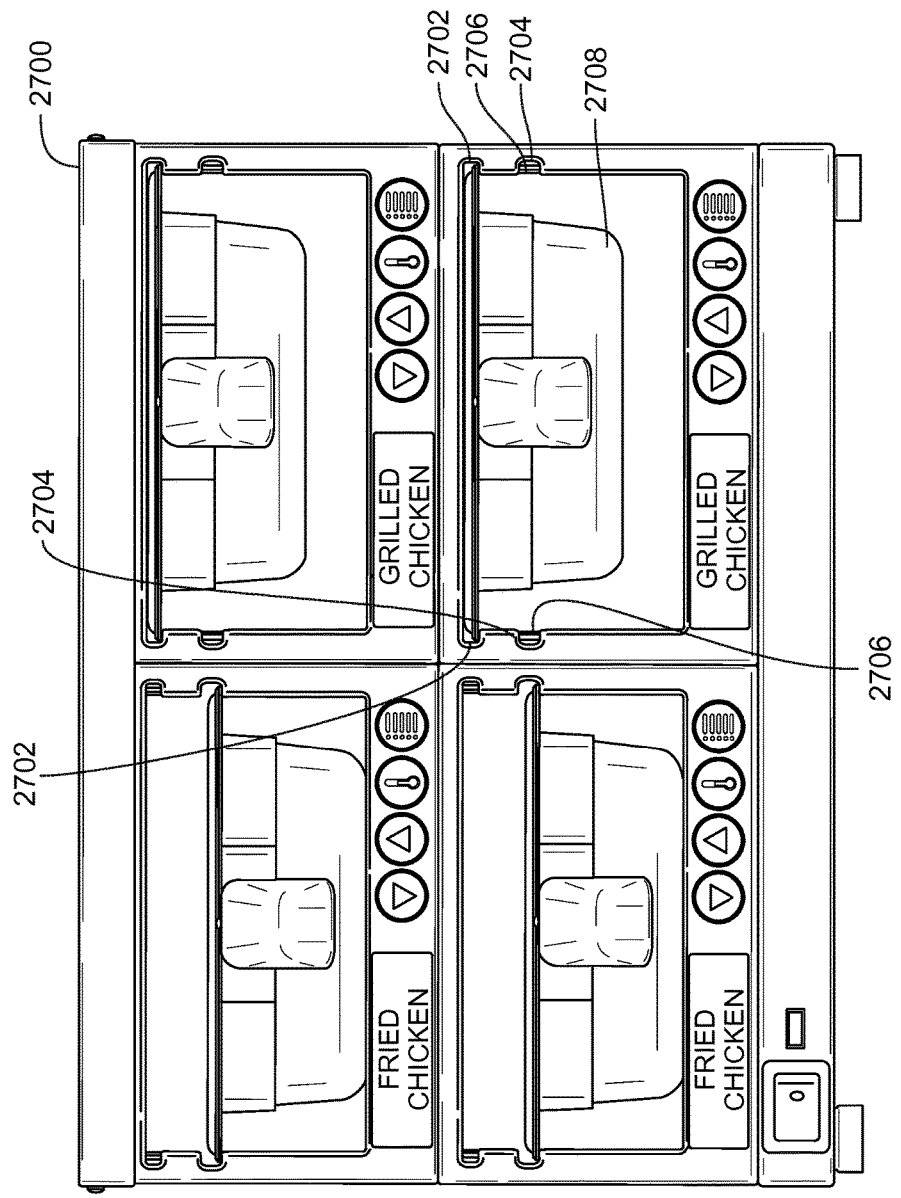
FIG. 27 illustrates another aspect of a modular heating bin that may be included in various embodiments of the disclosure.

FIG. 27 illustrates another aspect of a modular heating unit that may be included in various embodiments. In FIG. 27, a modular heating unit 2700 may control a gate or flap to allow rail assemblies to accept pans containing certain food items. For instance, rail assembly 2704 may include a gate or flap 2706 which may be controlled by modular heating unit's 2700 operating system or stored application program. The gate or flap 2706 may be controlled so that food items stored in pans to be covered or sealed maintain moisture during storage are not placed into rail assembly 2704. In an embodiment, the control system may review contents of the pan to be stored and determine which rail assembly 2702 or 2704 should be opened to allow proper pan placement. For instance, if hamburger patties are to be stored in pan 2708, a gate for flap may be retracted or opened so that rail assemble 2702 accepts pan 2708. In addition, gate or flap 2704 may be positioned to block entry into rail assembly 2704, so that pan 2708 is not mistakenly placed in the wrong location.

Figure 28:
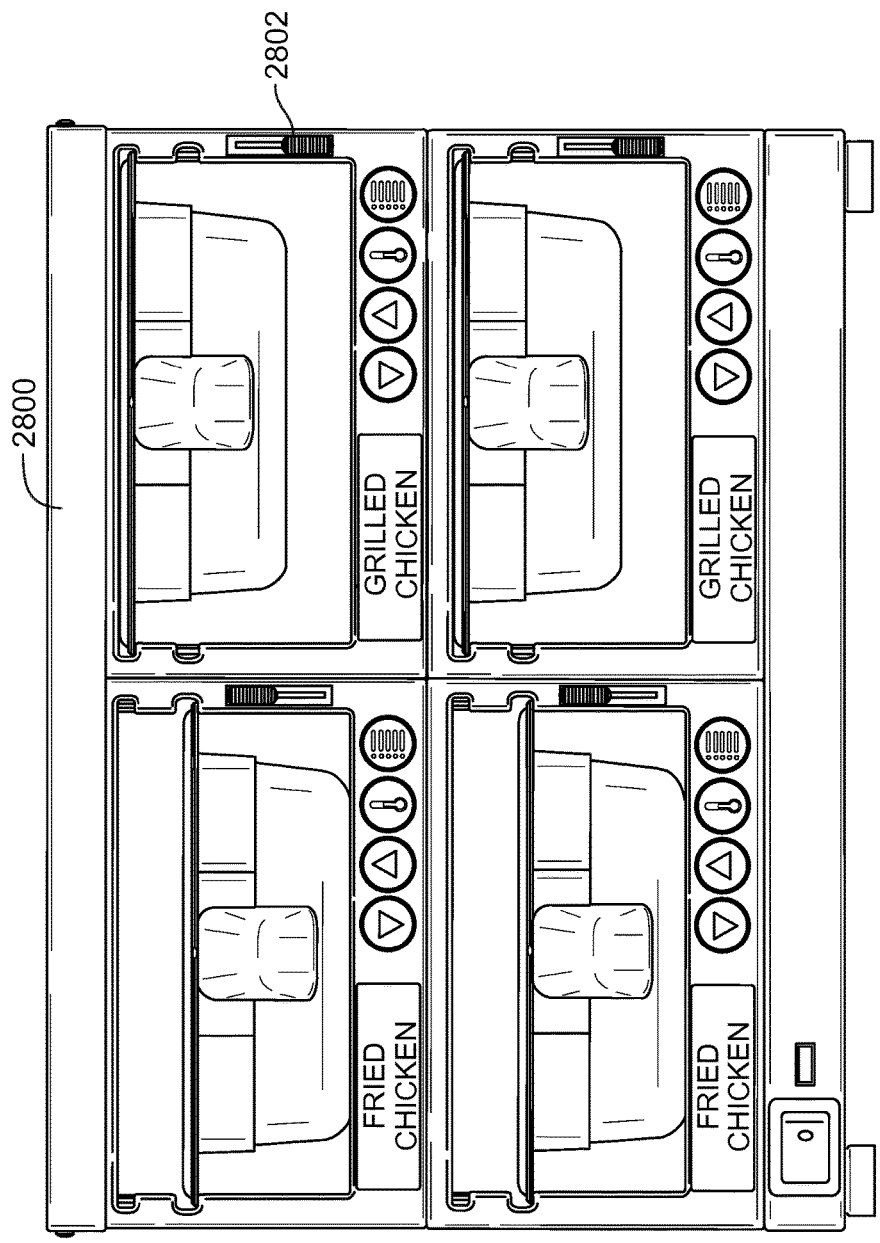
FIG. 28 illustrates another aspect of a modular heating bin that may be included in various embodiments of the disclosure.

FIG. 28 illustrates another aspect of a modular heating unit that may be included in various embodiments. In FIG. 28, a modular heating unit 2800 may utilize a user actuated sliding mechanism 2802 to control a gate or flap to allow rail assemblies to accept or reject pans containing certain food items. In an embodiment, sliding mechanism 2802 may be actuated so that only one of rail assemblies for given modular heating bin, at a particular time, can accept a pan. This may ensure that once a pan is removed and later returned to the modular heating bin it is placed in the correct rail assembly.

Figure 29:
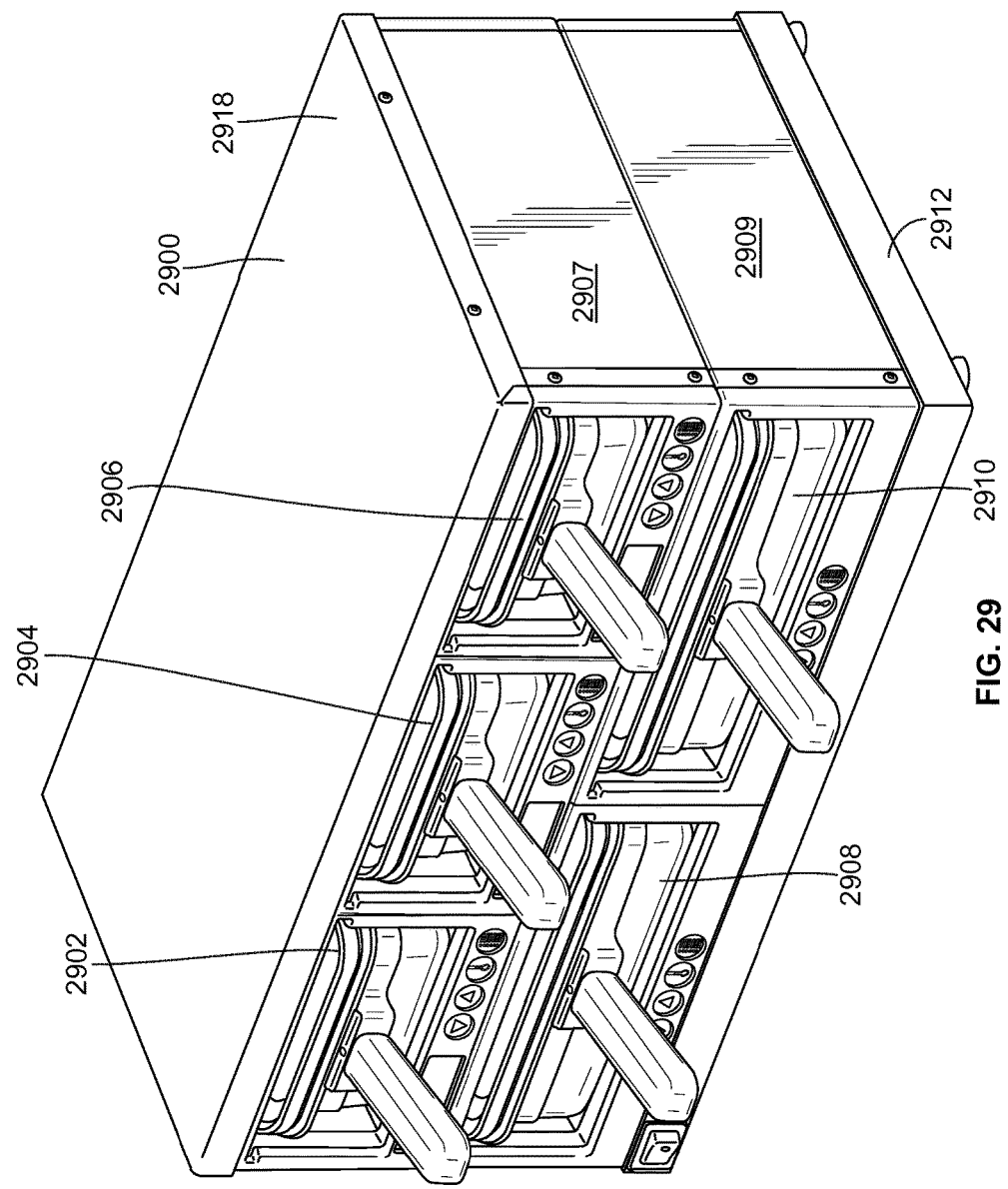
FIG. 29 illustrates a modular heating unit in accordance with an aspect of the disclosure.

FIG. 29 illustrates a modular heating unit 2900 in accordance with an aspect of the disclosure. In FIG. 29, modular heating unit 2900 may comprise three one-third sized modular heating bins 2902, 2904, and 2906 in a top row 2907. In addition, modular heating unit 2900 may also include a second row 2909 that includes two one-half sized modular heating bins 2908 and 2910. As shown in FIG. 29, the three adjacent one-third sized modular heating bins 2902, 2904, and 2906 may have similar overall length and depth as the second row 2909 of two adjacent one-half sized modular heating bins 2908 and 2910. In an embodiment, the two rows of modular heating bins 2907 and 2909 are interconnected together between a base unit 2912 and a top cover 2918.

In an aspect of the disclosure, different sized modular heating bins may be interconnected together to form a unitary modular heating unit such as modular heating unit 2900. The different sized modular heating bins may be stacked on top of each other and/or arranged adjacent to each other. In an embodiment, different sized base units may be interconnected with each other in order to connect different sized modular heating bins. In an embodiment, different sized top covers may be interconnected with each other to form a top cover for the modular heating unit. In an alternative embodiment, a single continuous unitary top cover may be made for various different potential arrangements and/or configurations of modular heating units.

In another aspect of the disclosure, a modular heating unit may comprise modular heating bins and operate without a base unit and top cover. Such a modular heating unit may have modular heating bins which are fully self-contained but may operatively interconnect with other each. The interconnection of at least two modular heating bins may form a modular heating unit with one of modular heating bins acting as a master controller for both modular heating bins.

Figure 30:
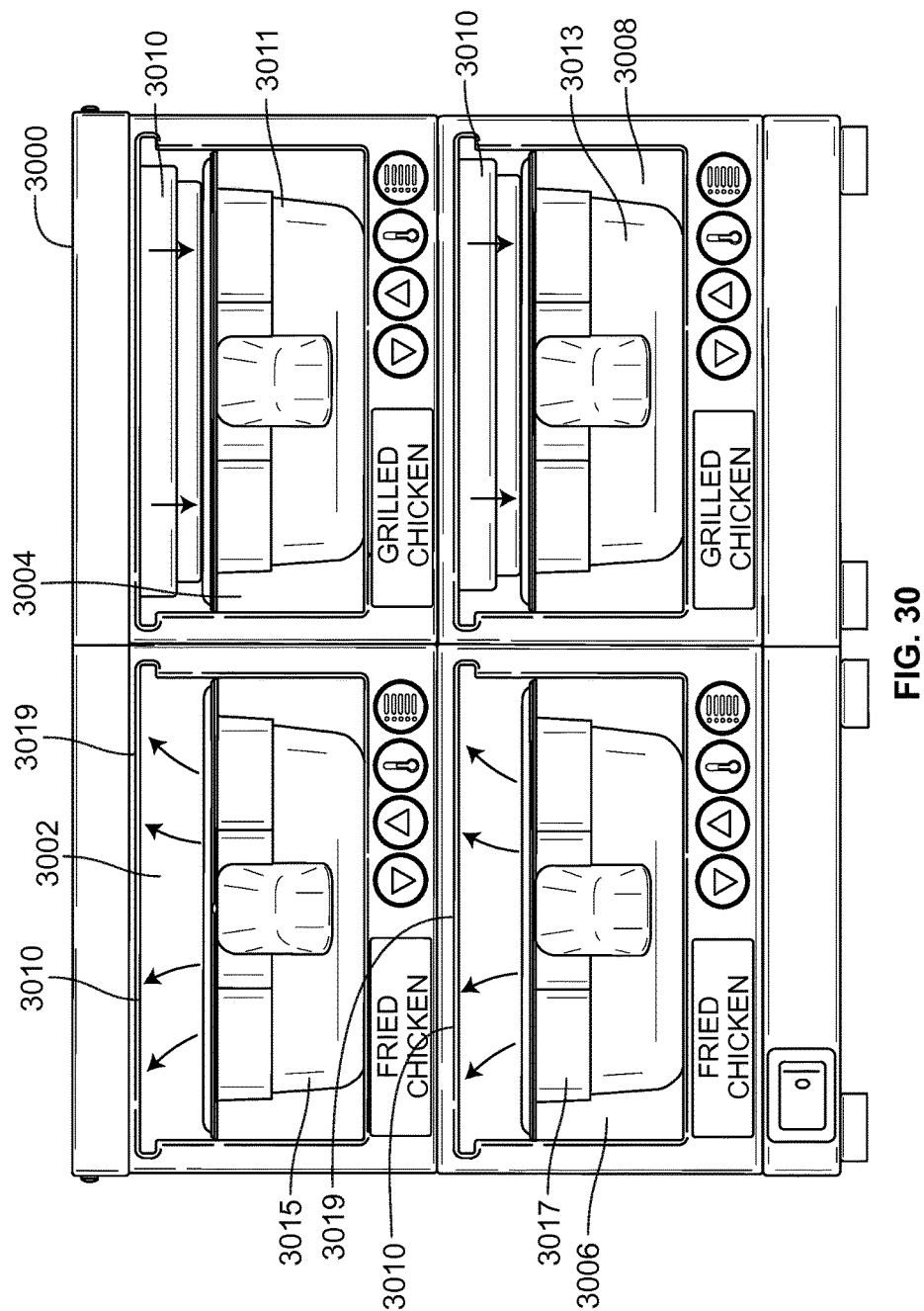
FIG. 30 illustrates a moving bladder assembly that may be implemented in various aspects of the disclosure.

FIG. 30 illustrates a moving bladder embodiment that may be implemented in various aspects of the disclosure. In FIG. 30, a moving bladder or vane portion may be included in various modular heating bins in various embodiments of the disclosure. For instance, FIG. 30 shows modular heating unit 3000 that may include modular heating bins 3002, 3004, 3006, and 3008. In an embodiment, modular heating bins 3004 and 3008 illustrate a bladder 3010 that moves from a first position to a second position to form a seal over a pan stored in the particular modular heating unit. The seal maintains food moisture for particular food products that are to be stored with covers such as grilled chicken. In FIG. 30, bladder 3010 is shown forming a seal over pans 3011 and 3013 of modular heating bins 3004 and 3008. The control system of modular heating unit 3000 based on received input that grilled chicken is being stored in pans 3011 and 3013 of modular heating bins 3004 and 3008 lowers bladder 3010 to form a seal over pans 3011 and 3013 upon placement of pans 3011 and 3013 into modular heating bins 3004 and 3008.

In an aspect of the disclosure, bladder 3010 may made of a rubber or other sealing food grade material. In an embodiment, bladder 3010 may be attached to a ceiling surface of each of the modular heating bins. In another embodiment, bladder 3010 may only extend near the openings of the modular heating bins extending between opposite located side walls.

Moreover, as shown in FIG. 30, the control system of modular heating unit 3000 based on received input that fried chicken is being stored in pans 3015 and 3017 of modular heating bins 3002 and 3006, stores bladder 3010 in a retracted position so that pans 3015 and 3017 can vent and allow moisture to escape to keep the fried chicken crispy. As shown, in modular heating bins 3002 and 3006, bladder 3010 is stored in a retracted position in a top portion 3019 of each modular heating bin 3002 and 3006.

Figure 31:
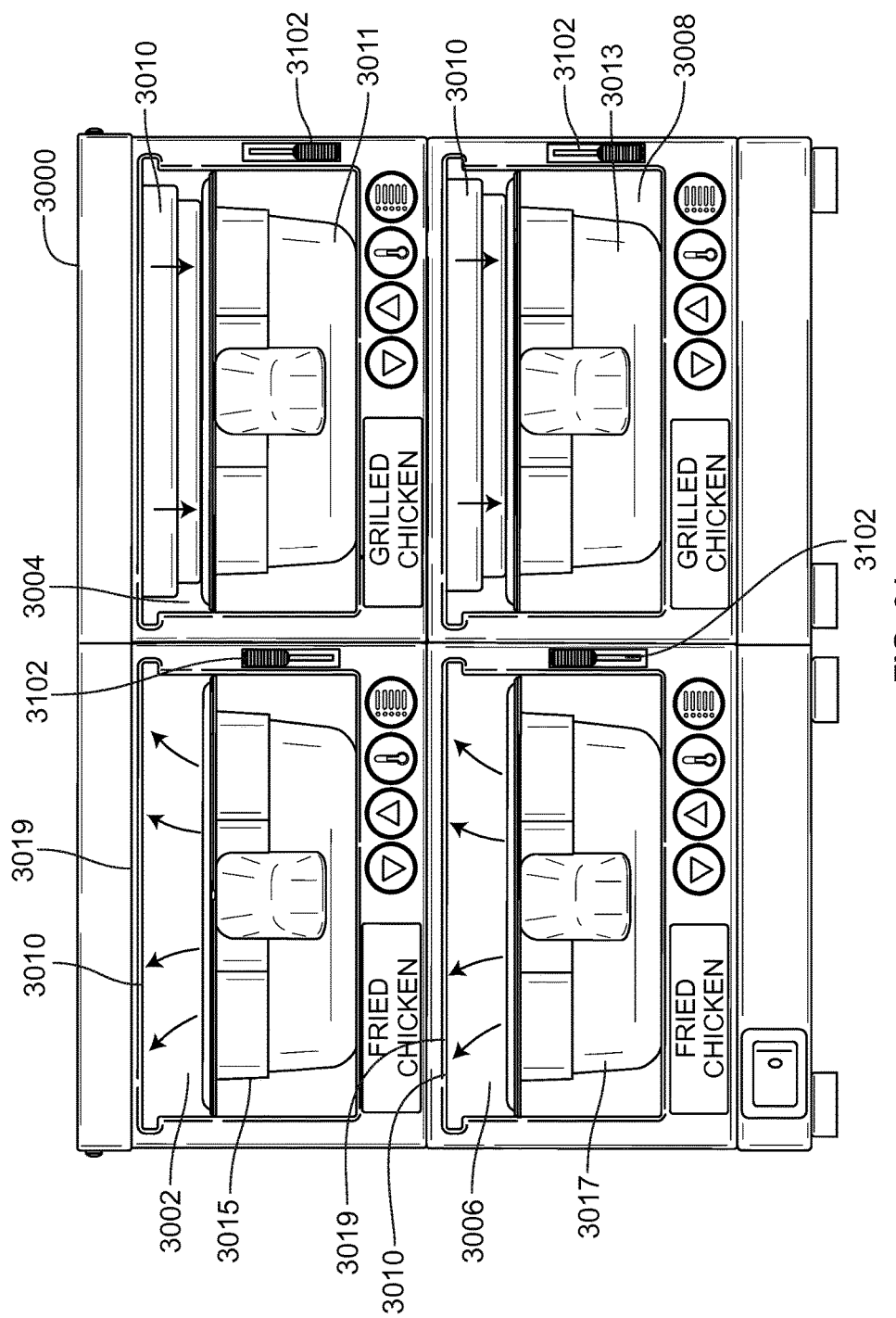
FIG. 31 illustrates another aspect of a modular heating unit having a moving bladder assembly that may be included in various embodiments.

FIG. 31 illustrates another aspect of a modular heating unit that may be included in various embodiments. In FIG. 31, a modular heating unit 3000 may utilize a user actuated sliding mechanism 3102 to control bladder 3010 of modular heating bins 3002, 3004, 3006, and 3008. In an embodiment, modular heating bins 3004 and 3008 illustrate a bladder 3010 that moves from a first position to a second position to form a seal over a pan stored in the particular modular heating unit. The seal maintains food moisture for particular food products that are to be stored with covers such as grilled chicken. In FIG. 31, bladder 3010 is shown forming a seal over pans 3011 and 3013 of modular heating bins 3004 and 3008. A user activated sliding mechanism 3102 may be used to lower bladder 3010 to form a seal over pans 3011 upon placement of pans 3011 and 3013 into modular heating bins 3004 and 3008.

In addition, as also shown in FIG. 31, the user activated sliding mechanism 3102 may also be used to retract bladder 3010 of modular heating bins 3002 and 3006 so pans 3015 and 3017 can vent and allow moisture to escape to keep stored fried chicken crispy. As shown, in modular heating bins 3002 and 3006, bladder 3010 is stored in a retracted position in a top portion 3019 of each modular heating bin 3002 and 3006.

Figure 32:
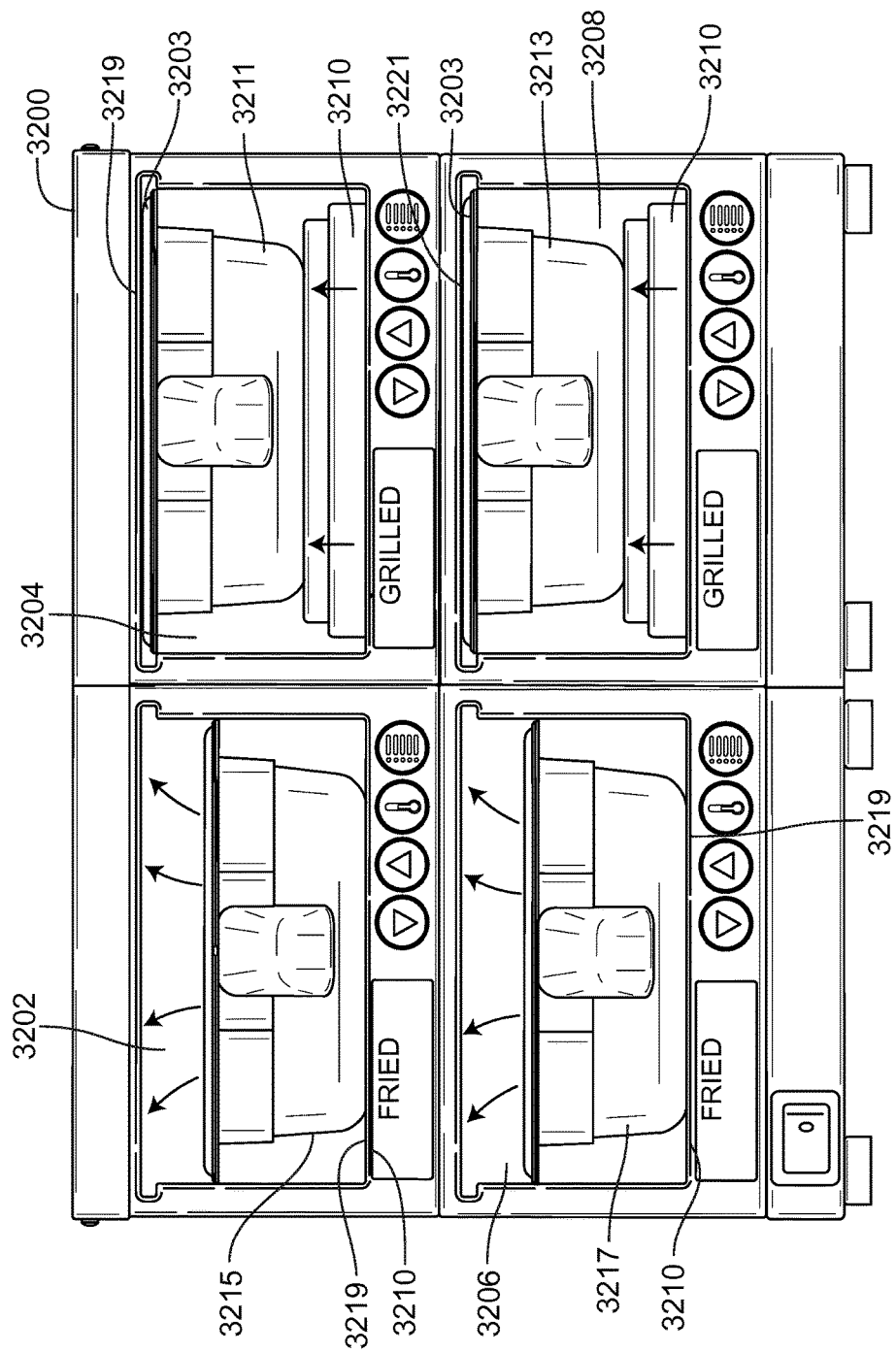
FIG. 32 illustrates a moving floor assembly that may be implemented in various aspects of the disclosure.

FIG. 32 illustrates a moving floor embodiment that may be implemented in various aspects of the disclosure. In FIG. 32, a moving floor portion may be included in various modular heating bins in various embodiments of the disclosure. For instance, FIG. 32 shows modular heating unit 3200 that may include modular heating bins 3202, 3204, 3206, and 3208. In an embodiment, modular heating bins 3204 and 3208 illustrate a floor 3210 that moves from a first position to a second position to raise a pan placed in the particular modular heating bin. In an embodiment, a pan such as pan 3211 is raised so that lip portion 3203 of pan 3211 forms a seal against a ceiling surface 3219 of modular heating bin 3204. The formed seal maintains food moisture for particular food products that are to be stored with covers such as grilled chicken. In FIG. 32, the lip portions 3203 of both pans 3211 and 3213 are in contact with ceiling surfaces 3219 and 3221 of modular heating bins 3204 and 3208, respectively.

In an embodiment, a control system of modular heating unit 3200, based on received input that grilled chicken is being stored in pans 3211 and 3213, raises floor 3210 so that a seal is formed between lip portions 3203 of each pan 3211 and 3213 and ceilings surfaces 3219 and 3221 of each modular heating bin 3204 and 3208.

Moreover, as shown in FIG. 32, the control system of modular heating unit 3200 based on received input that fried chicken is being stored in pans 3215 and 3217 of modular heating bins 3002 and 3006, stores bladder 3010 so pans 3015 and 3017 can vent and allow moisture to escape to keep the fried chicken crispy. As shown, in modular heating bins 3202 and 3206, floor 3020 is stored in a retracted position in a bottom portion 3019 of each modular heating bin 3202 and 3206.

Figure 33:
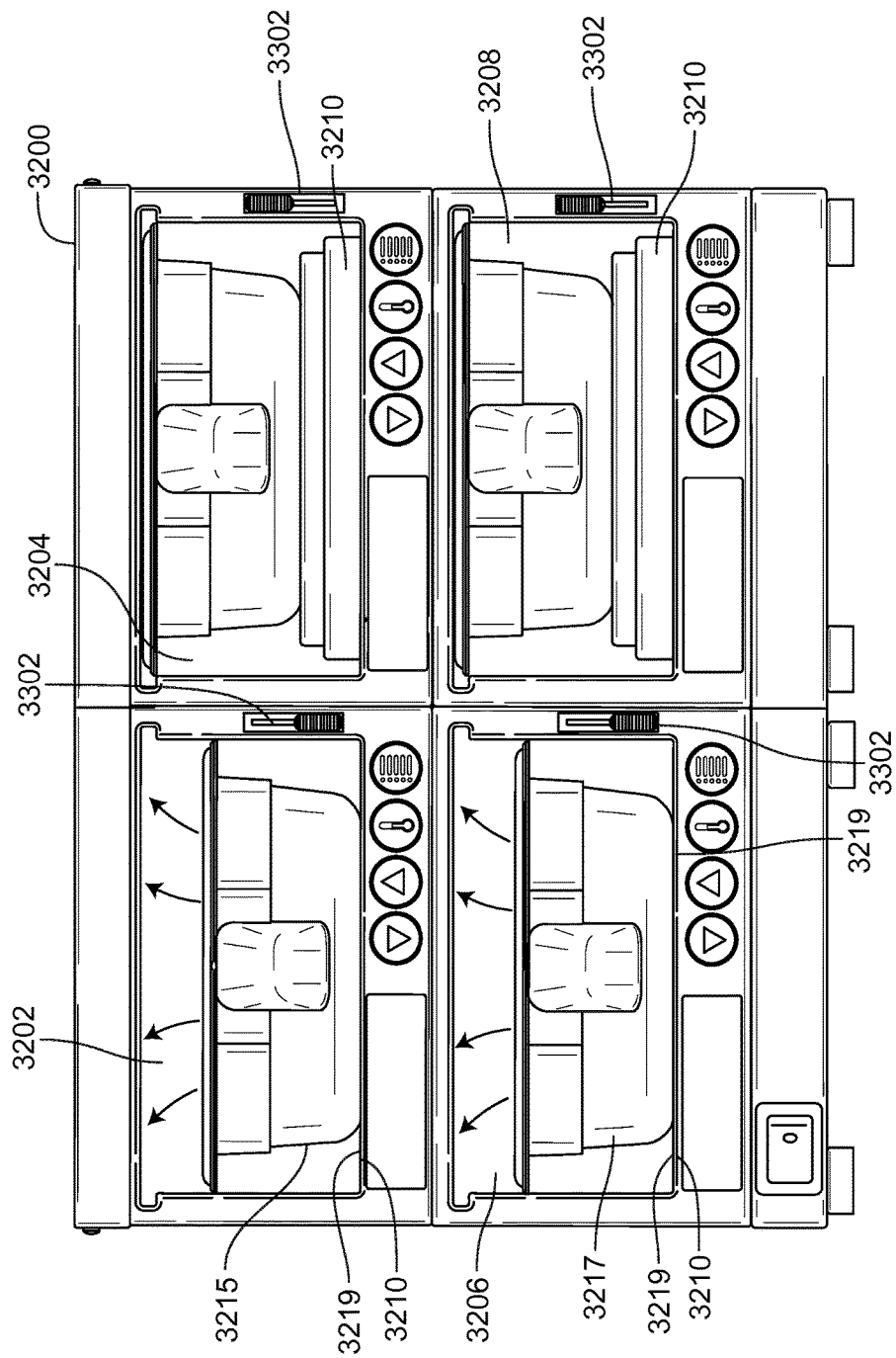
FIG. 33 illustrates another aspect of a modular heating unit having a moving floor assembly that may be included in various embodiments.

FIG. 33 illustrates another aspect of a modular heating unit that may be included in various embodiments. In FIG. 33, a modular heating unit 3200 may utilize a user actuated sliding mechanism 3302 to control floor 3210 of modular heating bins 3202, 3204, 3206, and 3208. In an embodiment, modular heating bins 3204 and 3208 illustrate a floor 3210 that moves from a first position to a second position to raise a pan placed in the particular modular heating bin so that a lip portion 3203 of the pan forms a seal against a ceiling surface of the modular heating bin. A user activated sliding mechanism 3302 may be used to raise floor 3210 to form a seal over pans 3211 and 3213 upon placement of pans 3211 and 3213 into modular heating bins 3204 and 3208.

In addition, as also shown in FIG. 33, the user activated sliding mechanism 3302 may also be used to retract floor 3210 of modular heating bins 3202 and 3206 so pans 3215 and 3217 can vent and allow moisture to escape to keep stored fried chicken crispy. As shown, in modular heating bins 3202 and 3206, floor 3210 may be stored in a retracted position in a bottom portion 3219 of each modular heating bin 3202 and 3206.

In another embodiment, bladder 3010 may also be incorporated into the moving floor embodiments described above with respect to FIGS. 32-33.

Figure 34:
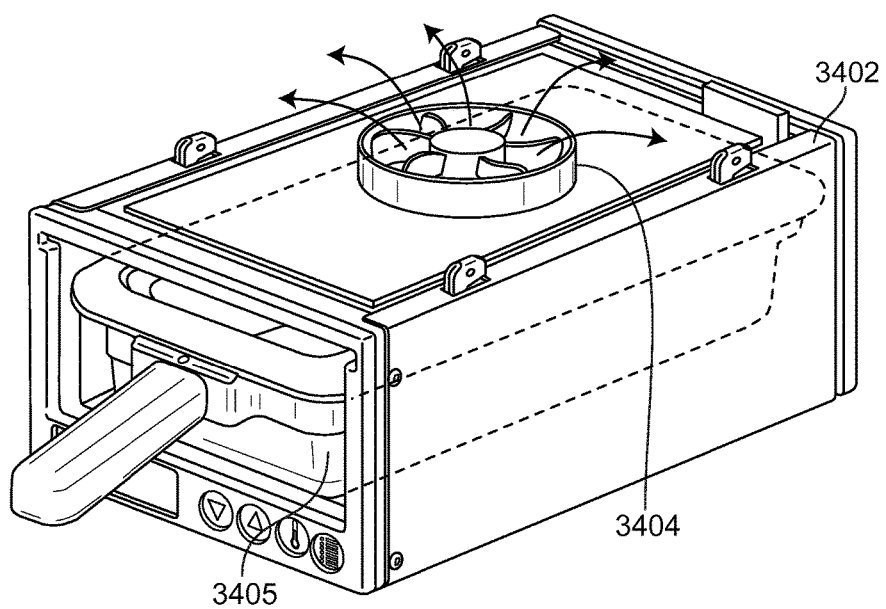
FIG. 34 illustrates a fan assembly that may be included in various aspects of the disclosure.

FIG. 34 illustrates another aspect of the disclosure that may be included in various aspects of the disclosure. In FIG. 34, a modular heating bin 3402 may include a fan 3404 to vent moisture from the modular heating bin 3402. In an embodiment, fan 3404 may remove moisture from a pan 3405 when turned "on" and may retain moisture in pan 3405 when switched "off." In an embodiment, fan 3404 may be controlled by a control unit based on the type of food stored in a pan 3405 placed in modular heating bin 3402. In an embodiment, fan 3405 may be box style fan or other style fan that when activated (turned "on") simulates a pan cover placed on top of pan 3405. In another embodiment, fan 3404 may also be incorporated into the moving bladder embodiment of FIG. 30-31 discussed above with respect to modular heating unit 3000.

Figure 35:
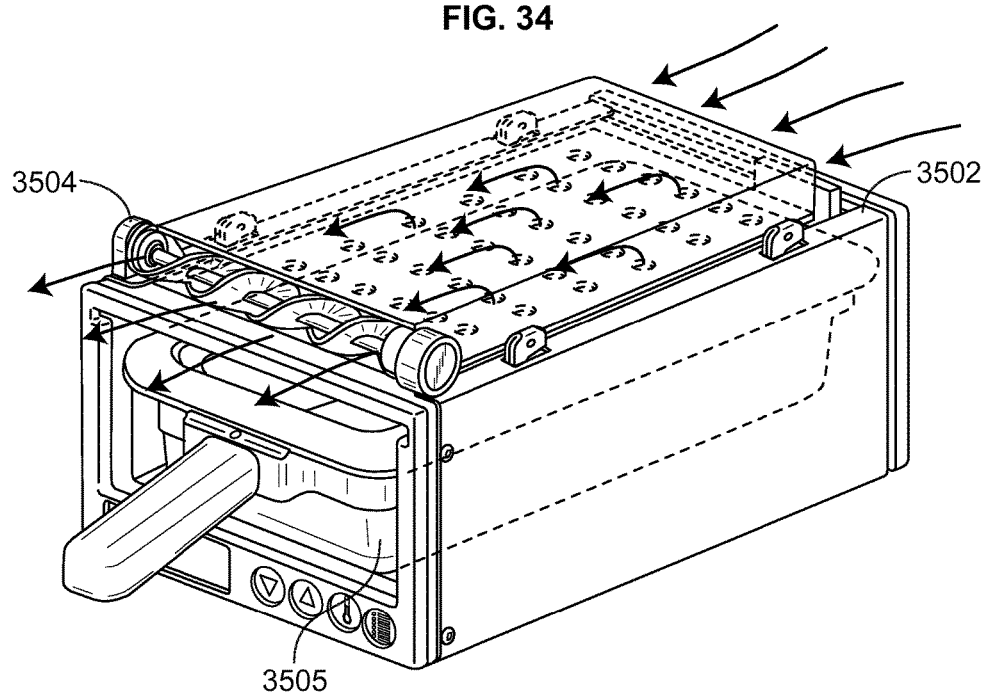
FIG. 35 illustrates another fan assembly that may be included in various aspects of the disclosure.

FIG. 35 illustrates another aspect of the disclosure that may be included in various aspects of the disclosure. In FIG. 35, a modular heating bin 3502 may include a fan 3504 to vent moisture from modular heating bin 3502. In an embodiment, fan 3504 may remove moisture from a pan 3505 when turned "on" and may retain moisture in pan 3505 when switched "off." In an embodiment, fan 3504 may be controlled by a control unit based on the type of food stored in a pan 3505 placed in modular heating bin 3502. In an embodiment, fan 3505 may be a screw style fan which may reduce the overall height of modular heating bin 3502. The screw style fan 3504 when activated may create a lower pressure in pan 3505 which in turn pulls out the hot humid air (moisture) from pan 3505. The screw style fan 3504 when activated (turned "on") simulates a pan cover placed on top of pan 3505.

Figure 36:
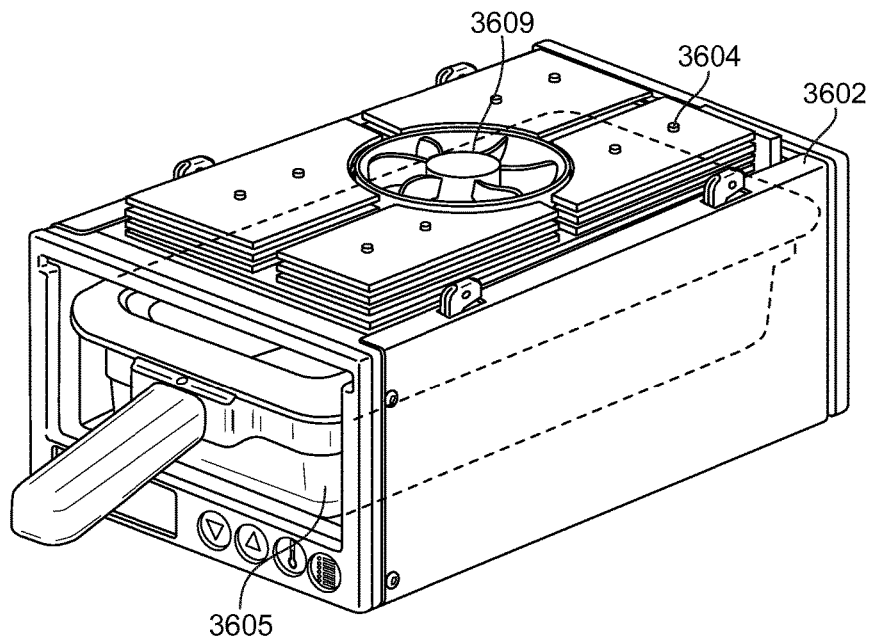
FIG. 36 illustrates a cooling module that may be included in various aspects of the disclosure.

FIG. 36 illustrates another aspect of the disclosure that may be included in various aspects of the disclosure. In FIG. 36, a modular heating bin 3602 may include a cooling module i.e. a Peltier cooling module 3604 having a fan 3609 to vent moisture from the modular heating bin 3602. In an embodiment, fan 3609 may remove moisture from a pan 3605 when turned "on" and may retain moisture in pan 3605 when switched "off"

Figure 37:
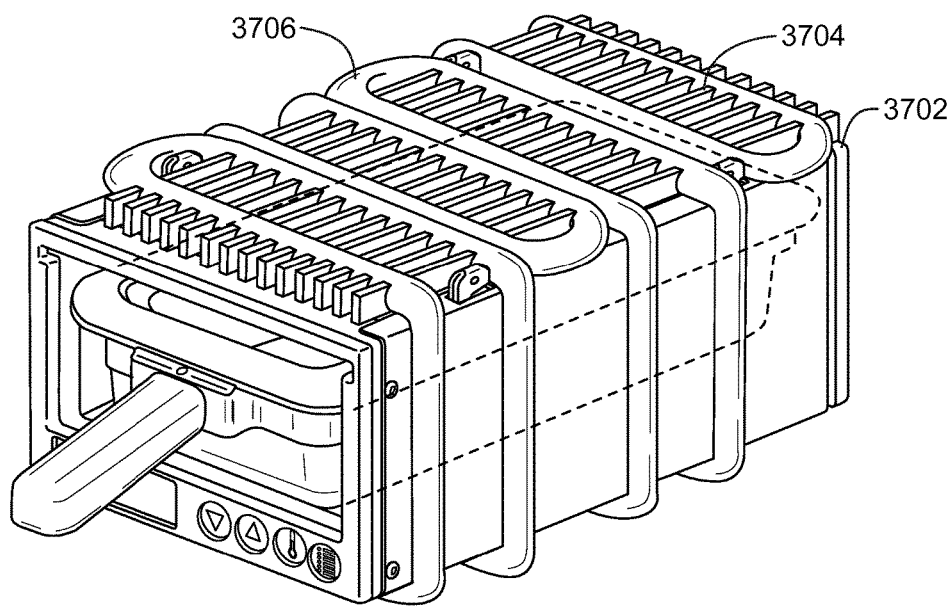
FIG. 37 illustrates another cooling module that may be included in various aspects of the disclosure.

FIG. 37 illustrates another aspect of the disclosure that may be included in various aspects of the disclosure. In FIG. 37, a modular heating bin 3702 may include a cooling module 3704 to vent moisture from the modular heating bin 3702. In an embodiment, cooling module 3704 may include a cooper wound tube 3706.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps discussed herein may be performed in other than the recited order, and that one or more steps may be optional in accordance with aspects of the invention.

What is claimed is:

1. A modular heating unit comprising:
   a base unit, the base unit including a substantially enclosed housing formed by a top wall, a bottom wall, and a plurality of side walls, the housing including a mounting tab extending vertically from the top wall;
   power and control circuitry disposed within the base unit;
   at least a first modular heating bin and a second modular heating bin, each of the first modular heating bin and the second modular heating bin including a top wall, a bottom wall, a back wall, and two side walls, the first modular heating bin and the second modular heating bin being configured to be arranged in different positions to accommodate different cooking space dimensions, the first modular heating bin being releasably and operatively connected to the base unit by the mounting tab, the first modular heating bin and the second modular heating bin each including at least one heating element,
   wherein the bottom wall of the first modular heating bin is placed upon the top wall of the base unit,
   wherein the base unit includes at least one connector on the top wall that operatively connects the power and control circuitry within the base unit to the first modular heating bin of the at least two modular heating bins, the connector being configured to provide power and communication signals between the base unit and the first modular heating bin, and
   wherein the base unit includes the top wall, the bottom wall, and the plurality of side walls, when the base unit and the first modular heating bin are separated from one another.

2. The modular heating unit of claim 1, wherein the first modular heating bin and the second modular heating bin are stacked on top of each other on the base unit.

3. The modular heating unit of claim 1, wherein the first modular heating bin and the second modular heating bin are positioned laterally adjacent to each other.

4. The modular heating unit of claim 1, further including a third modular heating bin, the first modular heating bin, the second modular heating bin, and the third modular heating bin being stackable in different positions, the first modular heating, the second modular heating bin, and the third modular heating bin being operatively connected to the base unit.

5. The modular heating unit of claim 4, wherein the first modular heating bin, the second modular heating bin, and the third modular heating bin are stacked on top of each other on the base unit.

6. The modular heating unit of claim 4, wherein the first modular heating, the second modular heating bin, and the third modular heating bin are positioned adjacent to each other, the first modular heating bin being releasably connected to the base unit.

7. The modular heating unit of claim 1, further including 1+N modular heating bins configured to be arranged in different positions.

8. The modular heating unit of claim 1, wherein:
   the base unit is configured to provide communication between first modular heating bin and the second modular heating bin and an external network.

9. The modular heating unit of claim 1, wherein the base unit is configured to provide wireless communication between the base unit and the first modular heating bin and the second modular heating bin.

10. The modular heating unit of claim 1, wherein the first modular heating bin and the second modular heating bin are configured to interlock to the base unit with the mounting tab.

11. A modular heating unit comprising:
    a base unit, the base unit including a substantially enclosed housing formed by a top wall, a bottom wall, and a plurality of side walls, the housing including a mounting tab extending vertically from the top wall;
    power and control circuitry disposed within the base unit;
    a first modular heating bin having a top wall, a bottom wall, and two side walls that form a first chamber, and a first heating apparatus, the first heating apparatus for heating the first chamber;
    a second modular heating bin having a top wall, a bottom wall, and two side walls that form a second chamber, and a second heating apparatus, the second heating apparatus for heating the second chamber; and
    the first and second modular heating bins are configured to be arranged in different positions to accommodate different cooking space dimensions, the first modular heating bin being releasably and operatively connected to the base unit by the mounting tab,
    wherein the bottom wall of the first modular heating bin is placed upon the top wall of the base unit, wherein the base unit includes at least one connector on the top wall that operatively connects the power and control circuitry within the base unit to the first modular heating bin, the connector being configured to provide power and communication signals between the base unit and the first modular heating bin, and wherein the base unit includes the top wall, the bottom wall, and the plurality of side walls when the base unit and the first modular heating bin are separated from one another.

12. The modular heating unit of claim 11, further including a third modular heating bin having a third chamber and a third heating apparatus, the first, second and third modular heating bins being stackable in different configurations, the first, second and third modular heating bins being operatively connected to the base unit.

13. The modular heating unit of claim 11, further including 1+N modular heating bins stackable in different configurations, the 1+N modular heating bins being operatively connected to the base unit.

14. The modular heating unit of claim 11, wherein the first and second modular heating bins are operatively connected to the base unit in at least a first configuration, where the first and second modular heating bins are connected to the base unit laterally adjacent to each other, and a second configuration where the first modular heating bin is connected to the base unit and the second modular heating bin is stacked on top of the first modular heating bin.

15. The modular heating unit of claim 11, wherein the first and second modular heating bins have a first connecting structure on the top of the first and second modular heating bins and a second connecting structure on the bottom of the first and second modular heating bins, wherein the first connecting structure of the first modular heating bin is connectable to the second connecting structure of the second modular heating bin.

16. The modular heating unit of claim 11, wherein the first and second modular heating bins have a first connecting structure on the top of the first and second modular heating bins and a second connecting structure on the bottom of the first and second modular heating bins, wherein the first connecting structure of the second modular heating bin is connectable to the second connecting structure of the first modular heating bin.

17. The modular heating unit of claim 11, wherein the first and second modular heating bins have a first connecting structure on the top of the first and second modular heating bins and a second connecting structure on the bottom of the first and second modular heating bins.

18. A modular heating unit comprising:
a top cover;
a base unit, the base unit including substantially enclosed housing formed by a top wall, a bottom wall, and a plurality of side walls, the housing including a mounting tab extending vertically from the top wall;
power and control circuitry disposed within the enclosure;
a first modular heating bin, the first modular heating bin having a first set of dimensions, a top wall, a bottom wall, a back wall, and two side walls;
a second modular heating bin, the second modular heating bin having a second set of dimensions, the second set of dimensions different from the first set of dimensions of the first modular heating bin, the second modular heating bin including a top wall, a bottom wall, a back wall, and two side walls;
the first and second modular heating bins being configured to be arranged in different positions to accommodate different cooking space dimensions, the first modular heating bin being releasably and operatively connected to the base unit by the mounting tab,
wherein the bottom wall of the first modular heating bin is placed upon the top wall of the base unit,
wherein the base unit includes at least one connector on the top wall that operatively connects the power and control circuitry within the base unit to the first modular heating bin, the connector being configured to provide power and communication signals between the base unit and the first modular heating bin, and
wherein the base unit includes the top wall, the bottom wall, and the side walls when the base unit and the first modular heating bin are separated from one another.

19. The modular heating unit of claim 18, further including a first pan and a second pan, the first pan and the second pan having different dimensions, the first pan sized for use in the first modular heating bin, the second pan sized for use in both the first modular heating bin and the second modular heating bin.

* * * * *